(12) United States Patent
Jarman et al.

(10) Patent No.: US 7,975,021 B2
(45) Date of Patent: Jul. 5, 2011

(54) METHOD AND USER INTERFACE FOR DOWNLOADING AUDIO AND VIDEO CONTENT FILTERS TO A MEDIA PLAYER

(75) Inventors: Matthew T. Jarman, Salt Lake City, UT (US); Brent L. Iverson, Lehi, UT (US)

(73) Assignee: Clearplay, Inc., Salt Lake City, UT (US)

( * ) Notice: Subject to any disclaimer, the term of this patent is extended or adjusted under 35 U.S.C. 154(b) by 926 days.

(21) Appl. No.: 11/256,419

(22) Filed: Oct. 20, 2005

(65) Prior Publication Data

US 2006/0101487 A1 May 11, 2006
US 2009/0210897 A9 Aug. 20, 2009

Related U.S. Application Data

(63) Continuation-in-part of application No. 11/104,924, filed on Apr. 12, 2005, and a continuation-in-part of application No. 09/694,873, filed on Oct. 23, 2000, now Pat. No. 6,898,799, and a continuation-in-part of application No. 09/695,102, filed on Oct. 23, 2000, now Pat. No. 6,889,383.

(60) Provisional application No. 60/561,851, filed on Apr. 12, 2004, provisional application No. 60/620,902, filed on Oct. 20, 2004.

(51) Int. Cl.
*G06F 15/16* (2006.01)
*H04N 7/16* (2011.01)

(52) U.S. Cl. .......................... 709/217; 709/225; 725/28

(58) Field of Classification Search .................. 709/228, 709/219, 217, 227, 225; 725/35, 28, 32, 725/25; 386/94; 706/15
See application file for complete search history.

(56) References Cited

U.S. PATENT DOCUMENTS 3,581,029 A 5/1971 Noiles
(Continued)

FOREIGN PATENT DOCUMENTS

EP 0240794 10/1987
(Continued)

OTHER PUBLICATIONS

Aguirre-Smith et al., "Parsing Movies in Context", Usenix, pp. 157-168, Summer 1991.
(Continued)

*Primary Examiner* — Jungwon Chang
(74) *Attorney, Agent, or Firm* — Polsinelli Shughart PC

(57) ABSTRACT

A client server arrangement for downloading media content filters from a server device to a client device. The media content filters define portions of a separate audio visual presentation containing potentially objectionable subject matter. Depending on user selections, identified portions of the audio/visual presentation may be skipped and/or muted during play. In one particular implementation, the client device, e.g., a DVD player, is configured to initiate a connection with a server device. Upon successful connection, the server device transmits one or more media content filters to the client device. The client device may be configured to determine whether a particular media content filter is available, to facilitate deletion of some existing media content filters in order to secure adequate memory space, and to ensure that the media player has an active account, before initiating a connection with the server device. The server device may be configured to determine whether the media player is associated with an active user account, whether a requested filter is available, and whether adequate memory space is available at the media player, before transmitting media content filters to the client device.

3 Claims, 36 Drawing Sheets

U.S. PATENT DOCUMENTS

| | | |
|---|---|---|
| 4,012,583 A | 3/1977 | Kramer |
| 4,081,754 A | 3/1978 | Jackson |
| 4,085,422 A | 4/1978 | Niwata et al. |
| 4,229,765 A | 10/1980 | Sanger |
| 4,246,495 A | 1/1981 | Pressman |
| 4,305,131 A | 12/1981 | Best |
| 4,348,696 A | 9/1982 | Beier |
| 4,386,436 A | 5/1983 | Kocher et al. |
| 4,449,198 A | 5/1984 | Kroon et al. |
| 4,475,132 A | 10/1984 | Rodesch |
| 4,506,387 A | 3/1985 | Walter |
| 4,520,404 A | 5/1985 | Von Kohorn et al. |
| 4,538,188 A | 8/1985 | Barker et al. |
| 4,554,584 A | 11/1985 | Elam et al. |
| 4,566,033 A | 1/1986 | Reidenouer |
| 4,569,026 A | 2/1986 | Best |
| 4,570,192 A | 2/1986 | Hori |
| 4,591,248 A | 5/1986 | Freeman |
| 4,605,964 A | 8/1986 | Chard |
| 4,605,973 A | 8/1986 | Von Kohorn |
| 4,644,515 A | 2/1987 | Allebest et al. |
| 4,685,003 A | 8/1987 | Westland |
| 4,685,131 A | 8/1987 | Horne |
| 4,689,619 A | 8/1987 | O'Brien, Jr. |
| 4,701,896 A | 10/1987 | Allebest et al. |
| 4,729,044 A | 3/1988 | Kiesel |
| 4,744,070 A | 5/1988 | Takemura et al. |
| 4,750,213 A | 6/1988 | Novak |
| 4,754,342 A | 6/1988 | Duffy |
| 4,766,541 A | 8/1988 | Bleich et al. |
| 4,775,935 A | 10/1988 | Yourick |
| 4,782,402 A | 11/1988 | Kanamaru |
| 4,789,894 A | 12/1988 | Cooper |
| 4,871,903 A | 10/1989 | Carrell |
| 4,872,151 A | 10/1989 | Smith |
| 4,873,585 A | 10/1989 | Blanton et al. |
| 4,888,796 A | 12/1989 | Olivo, Jr. |
| 4,891,694 A | 1/1990 | Way |
| 4,930,158 A | 5/1990 | Vogel |
| 4,930,160 A | 5/1990 | Vogel |
| 4,947,244 A | 8/1990 | Fenwick et al. |
| 4,949,187 A | 8/1990 | Cohen |
| 4,956,825 A | 9/1990 | Wilts et al. |
| 4,964,004 A | 10/1990 | Barker |
| 4,972,396 A | 11/1990 | Rafner |
| 4,979,050 A | 12/1990 | Westland et al. |
| 4,995,078 A | 2/1991 | Monslow et al. |
| 5,046,157 A | 9/1991 | Smith et al. |
| 5,051,837 A | 9/1991 | McJunkin |
| 5,057,932 A | 10/1991 | Lang |
| 5,060,068 A | 10/1991 | Lindstrom |
| 5,097,249 A | 3/1992 | Yamamoto |
| 5,101,364 A | 3/1992 | Davenport et al. |
| 5,107,343 A | 4/1992 | Kawai |
| 5,109,482 A | 4/1992 | Bohrman |
| 5,122,886 A | 6/1992 | Tanaka |
| 5,130,792 A | 7/1992 | Tindell et al. |
| 5,132,953 A | 7/1992 | Matsubayashi |
| 5,172,111 A | 12/1992 | Olivo, Jr. |
| 5,175,631 A | 12/1992 | Juri et al. |
| 5,195,135 A | 3/1993 | Palmer |
| 5,199,077 A | 3/1993 | Wilcox et al. |
| 5,206,929 A | 4/1993 | Langford et al. |
| 5,210,611 A | 5/1993 | Yee et al. |
| 5,218,672 A | 6/1993 | Morgan et al. |
| 5,223,924 A | 6/1993 | Strubbe |
| 5,231,310 A | 7/1993 | Oh |
| 5,253,066 A | 10/1993 | Vogel |
| 5,253,275 A | 10/1993 | Yurt et al. |
| 5,267,351 A | 11/1993 | Reber et al. |
| 5,274,463 A | 12/1993 | Matsumoto et al. |
| 5,280,462 A | 1/1994 | Yokogawa |
| 5,296,931 A | 3/1994 | Na |
| 5,313,297 A | 5/1994 | Fukui et al. |
| 5,331,353 A | 7/1994 | Levenson et al. |
| 5,333,091 A | 7/1994 | Iggulden et al. |
| 5,335,079 A | 8/1994 | Yuen et al. |
| 5,353,121 A | 10/1994 | Young et al. |
| 5,367,510 A | 11/1994 | Ando |
| 5,371,795 A | 12/1994 | Vogel |
| 5,387,942 A | 2/1995 | Lemelson |
| 5,434,678 A | 7/1995 | Abecassis |
| 5,465,113 A | 11/1995 | Gilboy |
| 5,477,277 A | 12/1995 | Shimoyanagida et al. |
| 5,477,527 A | 12/1995 | Tsuchiya et al. |
| 5,479,303 A | 12/1995 | Suzuki et al. |
| 5,481,296 A | 1/1996 | Cragun et al. |
| 5,521,900 A | 5/1996 | Ando et al. |
| 5,532,732 A | 7/1996 | Yuen et al. |
| 5,535,186 A | 7/1996 | Ishizawa |
| 5,543,851 A | 8/1996 | Chang |
| 5,546,365 A | 8/1996 | Roth |
| 5,561,457 A | 10/1996 | Cragun et al. |
| 5,572,260 A | 11/1996 | Onishi et al. |
| 5,574,567 A | 11/1996 | Cookson et al. |
| 5,583,576 A | 12/1996 | Perlman et al. |
| 5,589,945 A | 12/1996 | Abecassis |
| 5,598,276 A | 1/1997 | Cookson et al. |
| 5,610,653 A | 3/1997 | Abecassis |
| 5,634,849 A | 6/1997 | Abecassis |
| 5,659,366 A | 8/1997 | Kerman |
| 5,664,046 A | 9/1997 | Abecassis |
| 5,673,089 A | 9/1997 | Yuen et al. |
| 5,682,501 A | 10/1997 | Sharman |
| 5,684,918 A | 11/1997 | Abecassis |
| 5,696,866 A | 12/1997 | Iggulden et al. |
| 5,696,869 A | 12/1997 | Abecassis |
| 5,699,472 A | 12/1997 | Ueda |
| 5,703,655 A | 12/1997 | Corey et al. |
| 5,717,814 A | 2/1998 | Abecassis |
| 5,724,091 A | 3/1998 | Freeman et al. |
| 5,724,472 A | 3/1998 | Abecassis |
| 5,751,335 A | 5/1998 | Shintani |
| 5,757,417 A | 5/1998 | Aras et al. |
| 5,778,135 A | 7/1998 | Ottesen et al. |
| 5,809,471 A | 9/1998 | Brodsky |
| 5,828,402 A | 10/1998 | Collings |
| 5,832,212 A | 11/1998 | Cragun et al. |
| 5,835,722 A | 11/1998 | Bradshaw et al. |
| 5,870,708 A | 2/1999 | Stewart |
| 5,872,588 A | 2/1999 | Aras et al. |
| 5,886,746 A | 3/1999 | Yuen et al. |
| 5,913,013 A | 6/1999 | Abecassis |
| 5,953,485 A | 9/1999 | Abecassis |
| 5,987,210 A | 11/1999 | Iggulden et al. |
| 5,987,211 A | 11/1999 | Abecassis |
| 5,999,689 A | 12/1999 | Iggulden |
| 6,002,443 A | 12/1999 | Iggulden |
| 6,002,833 A | 12/1999 | Abecassis |
| 6,005,603 A | 12/1999 | Flavin |
| 6,009,433 A | 12/1999 | Kurano et al. |
| 6,011,895 A | 1/2000 | Abecassis |
| 6,038,367 A | 3/2000 | Abecassis |
| 6,061,680 A | 5/2000 | Scherf et al. |
| 6,067,401 A | 5/2000 | Abecassis |
| 6,072,520 A | 6/2000 | Yuen et al. |
| 6,072,934 A | 6/2000 | Abecassis |
| 6,075,550 A | 6/2000 | Lapierre |
| 6,091,886 A | 7/2000 | Abecassis |
| 6,100,916 A | 8/2000 | August et al. |
| 6,115,057 A | 9/2000 | Kwoh et al. |
| 6,137,486 A | 10/2000 | Yoshida et al. |
| 6,151,444 A | 11/2000 | Abecassis |
| 6,154,207 A | 11/2000 | Farris et al. |
| 6,166,780 A | 12/2000 | Bray |
| 6,181,364 B1 | 1/2001 | Ford |
| 6,192,340 B1 | 2/2001 | Abecassis |
| 6,208,805 B1 | 3/2001 | Abecassis |
| 6,243,676 B1 | 6/2001 | Witteman |
| 6,262,775 B1 | 7/2001 | Kim |
| 6,263,505 B1 | 7/2001 | Walker et al. |
| 6,269,216 B1 | 7/2001 | Abecassis |
| 6,289,165 B1 | 9/2001 | Abecassis |
| 6,304,715 B1 | 10/2001 | Abecassis |
| 6,351,596 B1 | 2/2002 | Ostrover |
| 6,385,388 B1 | 5/2002 | Lewis et al. |
| 6,393,202 B1 | 5/2002 | Yamauchi et al. |

| | | |
|---|---|---|
| 6,408,128 B1 | 6/2002 | Abecassis |
| 6,463,207 B1 | 10/2002 | Abecassis |
| 6,477,705 B1 | 11/2002 | Yuen et al. |
| 6,504,990 B1 | 1/2003 | Abecassis |
| 6,553,178 B2 | 4/2003 | Abecassis |
| 6,553,566 B1 | 4/2003 | Grant et al. |
| 6,571,209 B1 | 5/2003 | Cohen et al. |
| 6,615,266 B1 * | 9/2003 | Hoffman et al. ............. 709/227 |
| 6,633,855 B1 * | 10/2003 | Auvenshine .................... 706/15 |
| 6,684,240 B1 * | 1/2004 | Goddard ...................... 709/217 |
| 6,701,523 B1 | 3/2004 | Hancock et al. |
| 6,714,723 B2 | 3/2004 | Abecassis |
| 6,732,367 B1 | 5/2004 | Ellis et al. |
| 6,756,997 B1 | 6/2004 | Ward, III et al. |
| 6,771,885 B1 | 8/2004 | Agnihotri et al. |
| 6,889,383 B1 * | 5/2005 | Jarman ........................... 725/28 |
| 6,898,799 B1 * | 5/2005 | Jarman ........................... 725/25 |
| 6,963,890 B2 | 11/2005 | Dutta et al. |
| 6,968,364 B1 * | 11/2005 | Wong et al. ................... 709/217 |
| 6,972,802 B2 | 12/2005 | Bray |
| 7,035,526 B2 | 4/2006 | Green |
| 7,139,031 B1 | 11/2006 | Bray |
| 7,249,366 B1 * | 7/2007 | Flavin ............................. 725/25 |
| 7,302,161 B2 | 11/2007 | Hisatomi et al. |
| 7,356,247 B2 | 4/2008 | Hamasaka et al. |
| 2002/0126983 A1 | 9/2002 | Sato et al. |
| 2003/0040962 A1 | 2/2003 | Lewis |
| 2003/0194211 A1 | 10/2003 | Abecassis |
| 2004/0006767 A1 | 1/2004 | Robson et al. |
| 2004/0128681 A1 | 7/2004 | Hancock et al. |
| 2004/0133657 A1 * | 7/2004 | Smith et al. ................... 709/219 |
| 2004/0226035 A1 | 11/2004 | Hauser, Jr. |
| 2004/0261099 A1 * | 12/2004 | Durden et al. ................. 725/32 |
| 2004/0263914 A1 | 12/2004 | Yule et al. |
| 2004/0267940 A1 * | 12/2004 | Dideriksen et al. ........... 709/228 |
| 2005/0013589 A1 * | 1/2005 | Shah et al. ...................... 386/94 |
| 2005/0066357 A1 * | 3/2005 | Ryal ............................... 725/35 |
| 2005/0086705 A1 | 4/2005 | Jarman et al. |
| 2005/0166234 A1 | 7/2005 | Jarman |
| 2005/0223013 A1 | 10/2005 | Jarman et al. |
| 2006/0031870 A1 | 2/2006 | Jarman |
| 2006/0095262 A1 | 5/2006 | Danieli |
| 2006/0177198 A1 | 8/2006 | Jarman et al. |
| 2006/0236220 A1 | 10/2006 | Jarman et al. |
| 2006/0277564 A1 | 12/2006 | Jarman |
| 2007/0168853 A1 | 7/2007 | Jarman |
| 2007/0180463 A1 | 8/2007 | Jarman |
| 2007/0186235 A1 | 8/2007 | Jarman et al. |
| 2007/0186236 A1 | 8/2007 | Jarman |
| 2007/0288516 A1 | 12/2007 | Jarman |

FOREIGN PATENT DOCUMENTS

| | | |
|---|---|---|
| EP | 0259666 | 3/1988 |
| EP | 0443676 | 8/1991 |
| GB | 2041586 | 9/1980 |
| GB | 2179771 | 3/1987 |
| WO | WO97/23996 | 7/1997 |
| WO | WO99/34598 | 7/1999 |

OTHER PUBLICATIONS

Akimoto et al., "Pixel-Selected Ray Tracing", IEEE Computer Graphics & Applications, pp. 14-22, Jul. 1991.
Allen, Christina, "The Use of Video in Organizational Studies", SIGCHI Bulletin, vol. 21, No. 2, pp. 115-117, Oct. 1989.
Allen, James F., "Maintaining Knowledge about Temporal Intervals", Communications of the ACM, vol. 26, No. 11, pp. 832-843, Nov. 1983.
Anderson et al., "A Continuous Media I/O Server and Its Synchronization Mechanism", IEEE, pp. 51-57, Oct. 1991.
Armstrong, Herbert B., "Improving Aviation Accident Research Through the Use of Video", SIGCHI Bulletin, vol. 21, No. 2, pp. 54-56, Oct. 1989.
Ashenhurst, Robert L., "ACM Forum—Letters", Communications of the ACM, vol. 32, No. 7, pp. 789-792, Jul. 1989.
Author Unknown, "Bibliography of Recent Publications on Computer Communication", ACM SIGCOMM, pp. 132-145, date unknown.
Author Unknown, "Closed Captioning Fundamentals", Link Electronics, Inc., http://www.linkelectronics.com/htm/techcc.htm, 7 pages, date unknown.
Author Unknown, "Impression Delivery Aquires Prime Cut Entertainment, Broadening its Media Base Into the Video Cassette Distribution Business", PR Newswire Association, Inc., 2 pages, Dec. 1, 1992.
Author Unknown, "News Releases", http://www.tvguardian.com/html/movies.html, 1 page, 1999.
Author Unknown, "News Track", Communications of the ACM, vol. 32, No. 7, pp. 777-778, Jul. 1989.
Author Unknown, "Principle Solutions, Inc.", http://www.tvguardian.com/html/about_us.htm, 1 page, 1999.
Author Unknown, "Purchase TVGuardian", http://www.tvguardian.com/html/sales.html, 1 page, 1999.
Author Unknown, "QuickTime Video-Editing Software—Adobe Premiere 2.0", MacWorld, pp. 192-193, Jan. 1993.
Author Unknown, "Season Pass", Tivo, http://www.tivo.com/1.2.1.asp, 1 page, date unknown.
Author Unknown, "TheFreeDictionary.com—Closed Caption", http://encyclopedia.thefreedictionary.com/Closed%20caption, 3 pages, date unknown.
Author Unknown, "TVGuardian Home—The Foul Language Filter", http//www.tvguardian.com/, 1 page, 1999.
Author Unknown, "TVGuardian In the News", http://www.tvguardian.com/html/in_the_news.html, 1 page, 1999.
Banerjee, Sanjay, Effects on Moral Rights in renting altered films and in supplying DVD altering software on-line: An analysis of the outcome of possible lawsuits in the US, UK and France, Dissertation for the University of Strathclyde, 68 pages, Sep. 12, 2003.
Billingsley, Pat, "The Standards Factor", SIGCHI Bulletin, vol. 21, No. 2, pp. 13-16, Oct. 1989.
Blinn, James F., "A Trip Down the Graphics Pipeline: Pixel Coordinates", IEEE Computer Graphics and Applications, pp. 81-85, Jul. 1991.
Bray, Rick, "Inventor's Comments", http://www.tvguardian.com/html/information.html, 4 pages, 1997.
Bruno, Richard, "Making compact disks interactive", IEEE Spectrum, pp. 40-45, Nov. 1987.
Brunhoff, Todd, "Vex Your Hardware: VEX Version 5.6", Tek Laboratories, Tektronix, Inc., 8 pages, date unknown.
Carey, Tom, "Draft for ACM Self-Assessment Procedure on Human-Computer Interaction", SIGCHI Bulletin, vol. 21, No. 2, pp. 17-24, Oct. 1989.
Carey, Tom, "Video Reviews", SIGCHI Bulletin, vol. 21, No. 2, pp. 128-130, Oct. 1989.
Chow, Mark D., "The Role of the Video Professional in a Research Environment", SIGCHI Bulletin, vol. 21, No. 2, pp. 83-87, Oct. 1989.
Clark, David R., "The Demise of Multimedia", IEEE Computer Graphics and Applications, pp. 75-80, Jul. 1991.
Coleman, Murray, "Dad of Teens Invents TV Filter for Foul Language", http://store.dove.org/Hardware/TVGuardian/ArDemGaz.htm, Little Rock Newspapers, Inc., 2 pages, 1997.
Crane, Gregory, "Hypermedia and the Study of Ancient Culture", IEEE Computer Graphics and Applications, pp. 45-51, Jul. 1991.
Crawford, Diane, "Two Bills Equal Forewarning", Communications of the ACM, vol. 32, No. 7, pp. 780-782, Jul. 1989.
Cudlitz, Stuart, "Star Quality", MacWorld, pp. 117-123, Jun. 1989.
Davenport et al., "Cinematic Primitives for Multimedia", IEEE Computer Graphics and Applications, pp. 67-74, Jul. 1991.
Davenport et al., "Numbers—A Medium That Counts", IEEE Computer Graphics and Applications, pp. 39-44, Jul. 1991.
Davidow, Bernard T., "Black box filters dirty words from TV shows", The Hartford Courant, 1 page, date unknown.
DeFanti et al., "BASIC Zgrass—A Sophisticated Graphics Language for the Bally Home Library Computer", pp. 33-37, date unknown.
Dixon, Douglas F., "Life Before the Chips: Simulating Digital Video Interactive Technology", Communications of the ACM, vol. 32, No. 7, pp. 824-831, Jul. 1989.
Feiner et al., "Automating the Generation of Coordinated Multimedia Explanations", IEEE, pp. 33-41, Oct. 1991.
Fox, Edward A., "Advances in Interactive Digital Multimedia Systems", IEEE, pp. 9-21, Oct. 1991.

Fox, Edward A., "The Coming Revolution", Communications of the ACM, vol. 32, No. 7, pp. 794-801, Jul. 1989.

Frenkel, Karen A., "The Next Generation of Interactive Technologies", Communications of the ACM, vol. 32, No. 7, pp. 872-881, Jul. 1989.

Greif et al., "Computer-Supported Cooperative Work: A Book of Readings", SIGCHI Bulletin, vol. 21, No. 2, pp. 125-128, Oct. 1989.

Grudin, Jonathan, "MCC Human Interface Laboratory Technical Reports", SIGCHI Bulletin, vol. 21, No. 2, pp. 131-137, Oct. 1989.

Halliday, Mark David, "Digital Cinema: An Environment for Multi-threaded Stories", Dissertation, Massachusetts Institute of Technology, 93 pages, 1985.

Harrison et al., "Video: A Design Medium", SIGCHI Bulletin, vol. 21, No. 2, pp. 62-66, Oct. 1989.

Henderson, Austin, "Video and Design", SIGCHI Bulletin, vol. 21, No. 2, pp. 104-107, Oct. 1989.

Horton et al., "Video as an Enabling Technology for Computer-Supported Cooperative Work", vol. 21, No. 2, Oct. 1989.

Kennedy, Sue, "Using Video in the BNR Usability Lab", SIGCHI Bulletin, vol. 21, No. 2, pp. 92-95, Oct. 1989.

Kocher, Bryan, "President's Letter", Communications of the ACM, vol. 32, No. 7, p. 779, Jul. 1989.

Kodali, Nagi, "3D Scene on 2D Screen: The Visualcad Connection", SIGCHI Bulletin, vol. 21, No. 2, pp. 52-53, Oct. 1989.

Lippman et al., "Coding Image Sequences for Interactive Retrieval", Communications of the ACM, vol. 32, No. 7, pp. 852-859, Jul. 1989.

Little, Thomas D.C., "Spatio-Temporal Composition of Distributed Multimedia Objects for Value-Added Networks", IEEE, pp. 42-50, Oct. 1991.

Mackay, Wendy, "EVA: An Experimental Video Annotator for Symbolic Analysis of Video Data", SIGCHI Bulletin, vol. 21, No. 2, pp. 68-71, Oct. 1989.

Mackay et al., "Introduction to the Special Issue on Video as a Research and Design Tool", SIGCHI Bulletin, vol. 21, No. 2, pp. 48-50, Oct. 1989.

Mackay et al., "Virtual Video Editing in Interactive Multimedia Applications", Communications of the ACM, pp. 802-810, Jul. 1989.

Malone et al., "Intelligent Information-Sharing Systems", Communications of the ACM, vol. 30, No. 5, pp. 390-402, May 1987.

Meghini et al., "Conceptual Modeling of Multimedia Documents", IEEE, pp. 23-30, Oct. 1991.

Michon, Brian, "Integrating Motion Video Into Computational Environments", SIGCHI Bulletin, vol. 21, No. 2, pp. 80-82, Oct. 1989.

Nam et al., "Audio-Visual Content-Based Violent Scene Characterization", Department of Electrical and Computer Engineering, University of Minnesota, 4 pages, date unknown.

Neal, Lisa, "The Use of Video in Empirical Research", SIGCHI Bulletin, vol. 21, No. 2, pp. 100-102, Oct. 1989.

Nielsen, Jakob, "Hypertext II", SIGCHI Bulletin, vol. 21, No. 2, pp. 41-47, Oct. 1989.

Palaniappan et al., "InternetExpress: An Inter-Desktop Multimedia Data-Transfer Service", IEEE, pp. 58-67, Oct. 1991.

Pea, Roy D., "Learning through Multimedia", IEEE Computer Graphics and Applications, pp. 58-66, Jul. 1991.

Press, Larry, "Thoughts and Observations at the Microsoft CD-ROM Conference", Communications of the ACM, vol. 32, No. 7, pp. 784-788, Jul. 1989.

Reisman, Sandy, "Developing Multimedia Applications", IEEE Computer Graphics and Applications, pp. 52-57, Jul. 1991.

Ripley, G. David, "DVI—A Digital Multimedia Technology", Communications of the ACM, vol. 32, No. 7, pp. 811-822, Jul. 1989.

Roske-Hofstrand, Renate J., "Video in Applied Cognitive Research for Human-Centered Design", SIGCHI Bulletin, vol. 21, No. 2, pp. 75-77, Oct. 1989.

Rubin, Benjamin, "Constraint-Based Cinematic Editing", Dissertation, Massachusetts Institute of Technology, 67 pages, Jun. 1989.

Rubin et al., "Structured Content Modeling for Cinematic Information", SIGCHI Bulletin, vol. 21, No. 2, pp. 78-79, Oct. 1989.

Sasnett, "Reconfigurable Video", Massachusetts Institute of Technology, Feb. 1986.

Schuette, Lawerence C., "Acoustic Holography", IEEE Computer Graphics and Applications, pp. 12-13, Jul. 1991.

Segall, Ricki Goldman, "Thick Descriptions: A Tool for Designing Ethnographic Interactive Videodiscs", SIGCHI Bulletin, vol. 21, No. 2, pp. 118-122, Oct. 1989.

Shaffer, Margaret T., "Use of the EVTA Process in the Evaluation of Human/System Interaction and Performance", SIGCHI Bulletin, vol. 21, No. 2, pp. 89-91, Oct. 1989.

Stevens, Scott M., "Intelligent Interactive Video Simulation of Code Inspection", Communications of the ACM, vol. 32, No. 7, pp. 832-843, Jul. 1989.

Tatar, Deborah, "Using Video-Based Observation to Shape the Design of a New Technology", SIGCHI Bulletin, vol. 21, No. 2, pp. 108-111, Oct. 1989.

Tinker, Michael, "DVI Parallel Image Compression", Communications of the ACM, vol. 32, No. 7, pp. 844-851, Jul. 1989.

Trigg, Randall H., "Computer Support for Transcribing Recorded Activity", SIGCHI Bulletin, vol. 21, No. 2, pp. 72-74, Oct. 1989.

Vertelney, Laurie, "Using Video to Prototype User Interfaces", SIGCHI Bulletin, vol. 21, No. 2, pp. 57-61, Oct. 1989.

Vin et al., "Multimedia Conferencing in the Etherphone Environment", IEEE, pp. 69-79, Oct. 1991.

Wolff et al., "Mars Navigator: An Interactive, Multimedia Exploration of the Red Planet", Computer Graphics, vol. 25, No. 3, pp. 145-146, Jul. 1991.

Woolsey, Kristina Hooper, "Multimedia Scouting", IEEE Computer Graphics and Applications, pp. 26-38, Jul. 1991.

Yu et al., "Efficient Placement of Audio Data on Optical Disks for Real-Time Applications", Communications of the ACM, vol. 32, No. 7, pp. 862-871, Jul. 1989.

Kavaler et al., "A Dynamic-Time-Warp Integrated Circuit for a 1000-Word Speech Recognition System", IEE Journal of Solid-State Circuits, vol. SC-22, No. 1, pp. 3-14, Feb. 1987.

Shaffer, Margaret T., "Use of the EVTA Process in the Evaluation of Human/System Interaction and Performance", SIGCHI Bulletin, vol. 21, No. 2, pp. 89-91, Oct. 1989.

Yelick, Edward, "The Authoring of Optical Videodiscs with Digital Data", Massachusetts Institute of Technology, 57 pages, 1982.

* cited by examiner

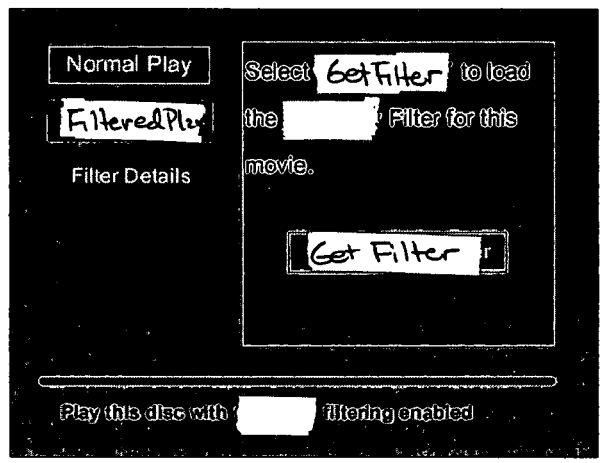

| 1. | [OK] | Focus [Get Filter] (Fig. 8). |
|---|---|---|
| 2. | [Arrow Right] | Focus [Get Filter] (Fig. 80). |
| 3. | [Arrow Left] | Return to "DVD Player Menu" |
| 4. | [Arrow Up] | Move focus to [Normal Play] button (Fig. 10). |
| 5. | [Arrow Down] | Move focus to [Normal Play] button (Fig. 10). |
| | If Filter not in recently updated Master Index. | Go directly to (Fig. 23). User has already tried or filter doesn't exist. |
| | If Filter will not ever exist. This check made from the Master Index. | Go directly to (Fig. 23). |
| | If the player has never been activated (new purchase) or has been deactivated. | Go directly to (Fig. 11). |
| | If insufficient memory for filters | Go directly to (Fig. 24). |

FIG. 7

| | | |
|---|---|---|
| 1. | [OK] | If Account Type is "Subscriber" go to (Fig. 16).<br><br>If Account Type is "Single Filter" go to (Fig. 14). |
| 2. | [Arrow Right] | Illegal |
| 3. | [Arrow Left] | Return to [Filtered Play] (Fig. 7) |
| 4. | [Arrow Up] | Move focus to [Normal Play] button (Fig. 10). |
| 5. | [Arrow Down] | Move focus to [Normal Play] button (Fig. 10) |

| 1. | [OK] | Go to Fig. 12). |
| --- | --- | --- |
| 2. | [Arrow Right] | illegal |
| 3. | [Arrow Left] | Return to "DVD Player Menu" |
| 4. | [Arrow Up] | Move focus to [Normal Play] button (Fig. 10). |
| 5. | [Arrow Down] | Move focus to [Normal Play] button (Fig. 10). |

| 1. | [OK] | Begins unfiltered playback. |
|---|---|---|
| 2. | [Arrow Right] | illegal |
| 3. | [Arrow Left] | Return to "DVD Player Menu" |
| 4. | [Arrow Up] | Move focus to Filtered Play (Fig. 7) or (Fig. 9) Button. |
| 5. | [Arrow Down] | Move focus to Filtered Play (Fig. 7) or (Fig. 9) Button. |

| 1. | [OK] | Validate Code, then go to (Fig. 7). |
|---|---|---|
| 2. | [Arrow Right] | Illegal |
| 3. | [Arrow Left] | Illegal |
| 4. | [Arrow Up] | Go to (Fig. 9) [Normal Play]. |
| 5. | [Arrow Down] | Go to (Fig. 9) [Normal Play]. |
| | Text | Text is information from connection dialog from server, or saved from previous connection. Varies dependent on the server account state. |
| | Validate Code | Go to (Fig. 7) or (Fig. 9). |
| | Invalid Code | Clears text and menu stays here. |

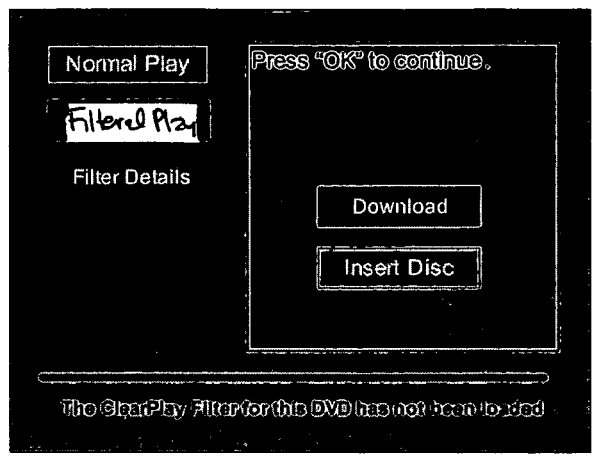

| | | |
|---|---|---|
| 1. | [OK] | If Account Type is "Subscriber" go to (Fig. 16).<br>If Account Type is "Single Filter" go to (Fig. 14).<br><br>See below for special cases. |
| 2. | [Arrow Right] | Go to (0) or see below for special cases. |
| 3. | [Arrow Left] | Go to (Fig. 9). |
| 4. | [Arrow Up] | Move focus to [Insert Disc] button (Fig. 13). |
| 5. | [Arrow Down] | Move focus to [Insert Disc] button (Fig. 13). |
| If Filter not in recently updated Master Index. | | Go directly to (Fig. 23).<br>User has already tried or filter doesn't exist. |
| If Filter will not ever exist. This check made from the Master Index. | | Go directly to Fig. 23). |
| If the player has never been activated (new purchase) or has been deactivated. | | Go directly to (Fig. 11). |
| If insufficient memory for filters | | Go directly to (Fig. 24). |

FIG. 12

| 1. | [OK] | Filter installation by way of removable memory or see below for special case. |
|---|---|---|
| 2. | [Arrow Right] | illegal |
| 3. | [Arrow Left] | Go to (Fig. 9). |
| 4. | [Arrow Up] | Move focus to [Download] (Fig. 12). |
| 5. | [Arrow Down] | Move focus to [Download] (Fig. 12). |
| If insufficient memory for filters | | Go directly to (Fig. 24). |

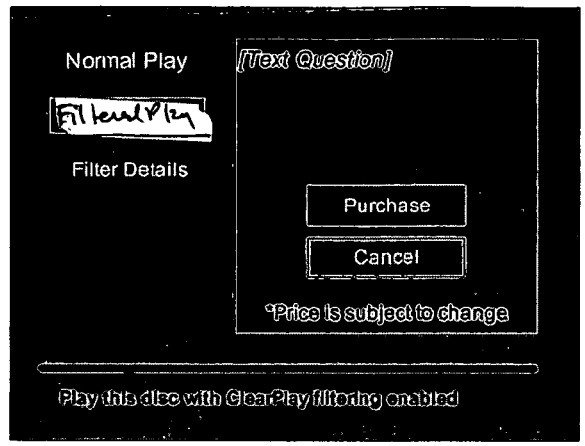

| 1. | [OK] | Purchase Accepted (Fig. 16). |
|---|---|---|
| 2. | [Arrow Right] | Illegal |
| 3. | [Arrow Left] | Illegal |
| 4. | [Arrow Up] | Move focus to [Cancel] (Fig. 15). |
| 5. | [Arrow Down] | Move focus to [Cancel] (Fig. 15). |
| *[Text Question]* | | |
| If the inserted DVD is found in the Master Index as available: | "The price of the filter for [Movie Title] is ####. Would you like to purchase the filter for this movie?" | |
| If the inserted DVD is not found in the Master Index as available: | "Filters cost ####. If the filter for the inserted DVD is available, would you like to purchase the filter?" | |

FIG. 14

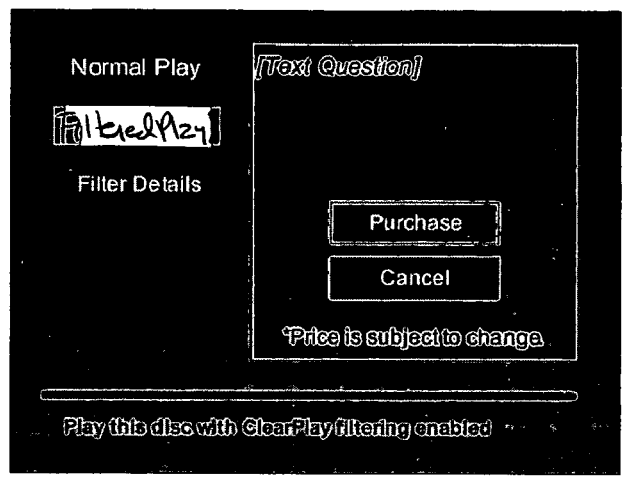

| 1. | [OK] | Cancelled Purchase go to (Fig. 7) for Modem Only or for Modem and Disc. |
|---|---|---|
| 2. | [Arrow Right] | Illegal |
| 3. | [Arrow Left] | Illegal |
| 4. | [Arrow Up] | Move Focus to [Purchase] (Fig. 14). |
| 5. | [Arrow Down] | Move Focus to [Purchase] (Fig. 14). |
| *[Text Question]* | | |
| If the inserted DVD is found in the Master Index as available: | "The price of the filter for [Movie Title] is ####. Would you like to purchase the filter for this movie?" | |
| If the inserted DVD is not found in the Master Index as available: | "Filters cost ####. If the filter for the inserted DVD is available, would you like to purchase the filter?" | |

FIG. 15

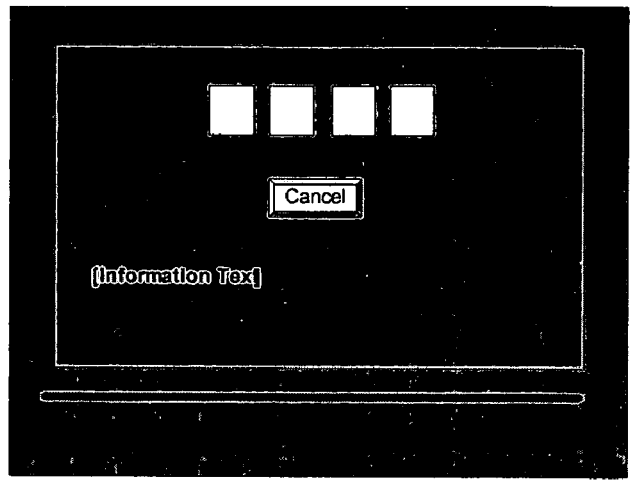

| 1. | [OK] | [Cancel] Go to (Fig. 7) or (Fig. 8). |
|---|---|---|
| 2. | [Arrow Right] | Illegal |
| 3. | [Arrow Left] | Move focus to Filtered Play (Fig. 12). |
| 4. | [Arrow Up] | Illegal |
| 5. | [Arrow Down] | Illegal |
| 6. | Number pad | Enter password. |
| 7. | If valid | Go to (Fig. 17). |
| 8. | If invalid. | Display "Password is invalid. Please reenter your password." Then reset this screen. |
| [Information Text] | | |
| Account Type is "Single Filter" | | Please enter your password to confirm your purchase. You will not be charged if the filter for this movie is not available. |
| Account Type is "Subscriber" | | Please enter your password to start the download. |

FIG. 16

| 1. | [OK] | Illegal |
|---|---|---|
| 2. | [Arrow Right] | illegal |
| 3. | [Arrow Left] | illegal |
| 4. | [Arrow Up] | Illegal |
| 5. | [Arrow Down] | Illegal |
| "Please Wait…" "Dialing…" "Connecting…" | | Text should slowly blink, and display relevant information from connection dialog. |
| Connection Established. | | Go to (Fig. 18). |
| Connection could not be made. | | Go to (Fig. 19). |

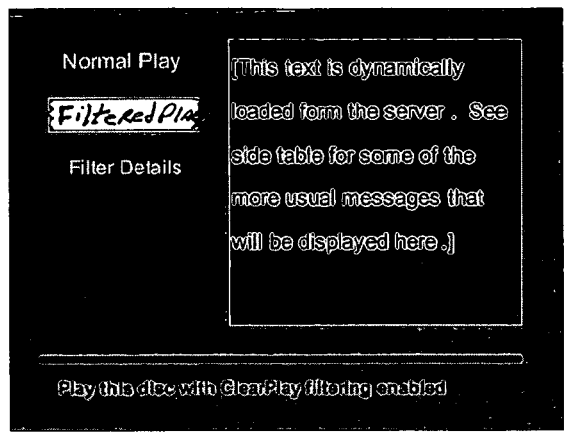

| 1. | [OK] | Illegal |
|---|---|---|
| 2. | [Arrow Right] | illegal |
| 3. | [Arrow Left] | illegal |
| 4. | [Arrow Up] | Illegal |
| 5. | [Arrow Down] | Illegal |
| Connection Made | [Account Name] displayed prominently at the top. | |
| "Updating Filter Index…" "Updating Filter…" | Text should slowly blink, and display relevant information from connection dialog. | |
| If Filter is not available | Go to (Fig. 21). | |
| If Completed Download. | Go to 0 | |
| Account inactive or Player deactivated. | Go to (Fig. 11). | |
| If already purchased. | "You have already purchased this filter and will not be billed for this download" | |
| If User Account is "Per Filter" And price different from stored price. | "Please note that the per filter price has changed to ####, and will be effective on your next download. Please call ###-###-#### for questions" | |
| Other messages as defined by server. | | |

FIG. 18

| 1. | [OK] | Go to (Fig. 17). |
|---|---|---|
| 2. | [Arrow Right] | Go to (Fig. 17). |
| 3. | [Arrow Left] | Illegal |
| 4. | [Arrow Up] | Move focus to [Normal Play] (Fig. 10). |
| 5. | [Arrow Down] | Move focus to [Normal Play] (Fig. 10). |
| | [Messages] | Text should slowly blink, and display relevant information from connection dialog. |

| 1. | [OK] | Illegal |
|---|---|---|
| 2. | [Arrow Right] | illegal |
| 3. | [Arrow Left] | illegal |
| 4. | [Arrow Up] | Illegal |
| 5. | [Arrow Down] | Illegal |
| "Closing Connection…" | | Text should slowly blink, and display relevant information from connection dialog. |
| Filter is available. | | |

| 1. | [OK] | Illegal |
|---|---|---|
| 2. | [Arrow Right] | illegal |
| 3. | [Arrow Left] | illegal |
| 4. | [Arrow Up] | Illegal |
| 5. | [Arrow Down] | Illegal |
| "Closing Connection…" | | Text should slowly blink, and display relevant information from connection dialog. |
| Filter is unavailable. | | Go to [Normal Play] (Fig. 10). |

| 1. | [OK] | Go to 0 |
|---|---|---|
| 2. | [Arrow Right] | Go to 0 |
| 3. | [Arrow Left] | Go to 0 |
| 4. | [Arrow Up] | Move focus to [Normal Play] (Fig. 10). |
| 5. | [Arrow Down] | Move focus to [Normal Play] (Fig. 10). |
| | [Messages] | Text should slowly blink, and display relevant information from connection dialog. |

| 1. | [OK] | Go to (Fig. 10) [Normal Play]. |
|---|---|---|
| 2. | [Arrow Right] | illegal |
| 3. | [Arrow Left] | illegal |
| 4. | [Arrow Up] | Go to (Fig. 10) [Normal Play]. |
| 5. | [Arrow Down] | Go to (Fig. 10) [Normal Play]. |

A flag is set for the removal of a certain number of filters (in particular 15). Then the display will alert the user to how many filters that are left to delete before he/she will be able to start the download. This information will be displayed on each page of the [Movie Filters] pages ( ). "You need to delete #." should be displayed in the status area as shown below. The message is always displayed if the memory storage is full. When the user has freed sufficient memory for the filters, return to 0 to continue the downloading process.

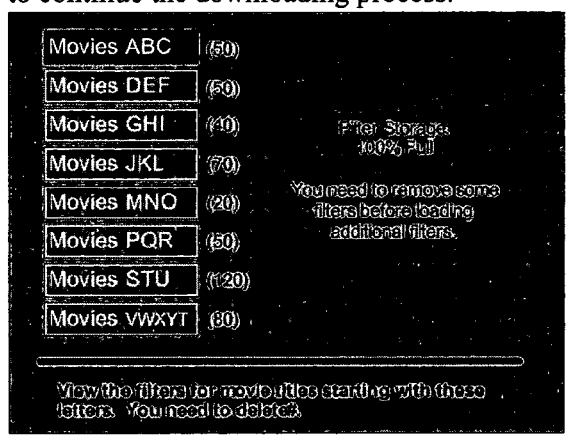

| | | |
|---|---|---|
| 1. | [OK] | Move focus to [Alpha N Movie Title 1] |
| 2. | [Arrow Right] | Move focus to [Alpha N Movie Title 1] |
| 3. | [Arrow Left] | Return to [Filters] |
| 4. | [Arrow Up] | Move focus to previous alpha group |
| 5. | [Arrow Down] | Move focus to next alpha group |

FIG. 24

| 1. | [OK] | Begins unfiltered playback. |
| 2. | [Arrow Right] | illegal |
| 3. | [Arrow Left] | Return to Filtered Play (Fig. 7). |
| 4. | [Arrow Up] | Move focus to Filtered Play (Fig. 7). |
| 5. | [Arrow Down] | Move focus to Filtered Play (Fig. 7). |

| 1. | [OK] | Validate at least 7 #s and move to (Fig. 27). |
|---|---|---|
| 2. | [Arrow Right] | Move to |
| 3. | [Arrow Left] | Return to Enter ISP Info (Fig. 25). |
| 4. | [Arrow Up] | Illegal |
| 5. | [Arrow Down] | Illegal |
| 6. | [Number Pad] | Numbers entered into textfield. Dashes will be displayed at the appropriate time to separate the phone number. |
| 7. | [Chapter Back] << | Return to Enter ISP Information (Fig. 25). |

| 1. | [OK] | Add character to TextField or select "Done". |
|---|---|---|
| 2. | [Arrow Right] | Move focus on keyboard. |
| 3. | [Arrow Left] | Move focus on keyboard. |
| 4. | [Arrow Up] | Move focus on keyboard. |
| 5. | [Arrow Down] | Move focus on keyboard. |
| 6. | [Chapter Back] | Return to [Enter Phone] (Fig. 26). |
| 7. | "Done" | Move to (Fig. 28). |

| 1. | [OK] | Add character to TextField or select "Done". |
|---|---|---|
| 2. | [Arrow Right] | Move focus on keyboard. |
| 3. | [Arrow Left] | Move focus on keyboard. |
| 4. | [Arrow Up] | Move focus on keyboard. |
| 5. | [Arrow Down] | Move focus on keyboard. |
| 6. | [Chapter Back] | Return to [Enter Username] (Fig. 27). |

| 1. | [OK] | Illegal |
|---|---|---|
| 2. | [Arrow Right] | Illegal |
| 3. | [Arrow Left] | Illegal |
| 4. | [Arrow Up] | Illegal |
| 5. | [Arrow Down] | Illegal |
| "Dialing…" "Sending User Name and Password…" | | Connection strings for the user to know that it is active. |
| Connection successful. | | Go to (Fig. 30). |
| Connection unsuccessful. | | Go to (Fig. 31). |

| 1. | [OK] | Go to [Filtered Play] (Fig. 7). |
| 2. | [Arrow Right] | Go to [Filtered Play] (Fig. 7). |
| 3. | [Arrow Left] | Go to [Filtered Play] (Fig. 7). |
| 4. | [Arrow Up] | Illegal |
| 5. | [Arrow Down] | Illegal |

| 1. | [OK] | Go to [Enter ISP Info] (Fig. 25). |
|---|---|---|
| 2. | [Arrow Right] | Go to [ Enter ISP Info ] (Fig. 25). |
| 3. | [Arrow Left] | Go to [ClearPlay] (Fig. 25). |
| 4. | [Arrow Up] | Illegal |
| 5. | [Arrow Down] | Illegal |
| | [messages] | Let the user know what went wrong. Phone number Username or Password. Or no dialtone? |

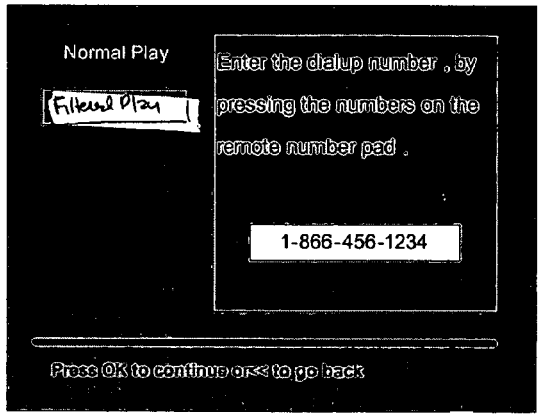

| | | |
|---|---|---|
| 1. | [OK] | Validate at least 7 #s and move to (Fig. 7). |
| 2. | [Arrow Right] | Move through the digits in the TextField. |
| 3. | [Arrow Left] | Move through the digits in the TextField. |
| 4. | [Arrow Up] | Illegal |
| 5. | [Arrow Down] | Illegal |
| 6. | [Number Pad] | Numbers entered into TextField. Dashes will be displayed at the appropriate time to separate the phone number. |
| 7. | [Chapter Back] << | Return to [Filtered Play] without updating the dialup number (Fig. 7). |

Note: The Input Field will need to be able to receive information for disabling phone services such as call waiting, and 9 for an outside line. This field should be at least 20 characters. Customer support will walk users through entering information on this screen. Other modem information could be included if necessary.

FIG. 32

| 1. | [OK] | Deletes the 15 filters. |
| 2. | [Arrow Right] | Go to [Delete Display] (Fig. 35). |
| 3. | [Arrow Left] | Return to [Filtered Play] (Fig. 7). |
| 4. | [Arrow Up] | Move focus to [Cancel]. |
| 5. | [Arrow Down] | Move focus to [Cancel].) |

| 1. | [OK] | Cancelled go to (Fig. 35). |
|---|---|---|
| 2. | [Arrow Right] | Go to [Delete Display] (Fig. 7). |
| 3. | [Arrow Left] | Return to [ClearPlay] (Fig. 33). |
| 4. | [Arrow Up] | Move focus to [Delete] (Fig. 33). |
| 5. | [Arrow Down] | Move focus to [Delete] (Fig. 33). |

| 1. | [OK] | Deletes the 15 filters. Return to (Fig. 9). |
| 2. | [Arrow Right] | Next Movie Title Page. |
| 3. | [Arrow Left] | Return to previous Movie Title page. |
| 4. | [Arrow Up] | Move focus to [Cancel] (Fig. 34) |
| 5. | [Arrow Down] | Move focus to [Cancel] ((Fig. 34). |

| 1. | [OK] | Cancelled go to (Fig. 24). |
|---|---|---|
| 2. | [Arrow Right] | Next Movie Title Page. |
| 3. | [Arrow Left] | Return to previous Movie Title page. |
| 4. | [Arrow Up] | Move focus to [Delete] (Fig. 33) |
| 5. | [Arrow Down] | Move focus to [Delete] (Fig. 33). |

METHOD AND USER INTERFACE FOR DOWNLOADING AUDIO AND VIDEO CONTENT FILTERS TO A MEDIA PLAYER

The present application is a non-provisional application claiming priority to pending provisional application No. 60/620,902 titled "Method and User Interface for Downloading Audio and Video Content Filters to a Media Player" filed on Oct. 20, 2004, which is hereby incorporated by reference herein. The present application also claims priority to and is a continuation-in-part of U.S. application Ser. No. 11/104,924 filed Apr. 12, 2005, which claims priority to U.S. Provisional Patent Application No. 60/561,851 filed on Apr. 12, 2004, and also claims priority to and is a continuation-in-part of U.S. patent application Ser. No. 09/694,873 filed on Oct. 23, 2000 now U.S. Pat. No. 6,898,799, and claims priority to and is a continuation-in-part of U.S. patent application Ser. No. 09/695,102 filed on Oct. 23, 2000 now U.S. Pat. No. 6,889,383.

The present application is also related to:

U.S. patent application Ser. No. 09/694,873, entitled "Multimedia Content Navigation and Playback," filed Oct. 23, 2000, now U.S. Pat. No. 6,898,799 which issued May 24, 2005;

U.S. patent application Ser. No. 09/695,102, entitled "Delivery of Navigation Data for Playback of Audio and Video Content," filed Oct. 23, 2000, now U.S. Pat. No. 6,889,383 which issued May 3, 2005; and Each of the above referenced related applications and patents are hereby incorporated by reference herein.

FIELD OF THE INVENTION

Aspects of the invention relate generally to the use of content filters for filtered playback of multimedia content, such as movies or other audio-video content, playable on a digital video disk or digital versatile disk (DVD) player, or similar media player. More specifically, the invention relates to downloading multimedia content filters to a client device, such as a media player, from a server device by way of some communication medium, such as a dialup connection, network connection, internet, etc.

BACKGROUND OF THE INVENTION

Technology currently exists which allows the user of a DVD player to filter objectionable content of a DVD-resident audio or video presentation, such as a motion picture, during playback on the player. This technology allows, for example, the viewing of a movie originally containing more adult-oriented content by younger, less mature viewers. Generally, the filtering function is provided by a media content "filter" resident within the DVD player that specifically applies to a particular audio or video presentation, such as a movie. The filter, which is typically stored within a nonvolatile logic memory, such as flash memory, indicates which portions of the audio or video presentation are to be skipped, or which audio portions are to be muted, by the DVD player during playback. Typically, whether the filter is employed for a particular playback of the presentation may be determined by the user by way of a menu selection system provided by the DVD player. Further, different forms of objectionable content, such as profane language, sexually explicit content, and so on, may also be selectively filtered by way of the menu system. In some systems, the filtering system may be protected by way of a user-defined password so that those not privy to the password are unable to defeat the filtering mechanism.

Each filter specific to a particular presentation is typically produced at some point after a DVD of the presentation has been released. Thus, while some filters for preexisting movies may be pre-installed in the DVD player, the player normally also includes a method of accepting and storing new filters as they are produced. Typically, filters are installed by way of a CD, DVD, or other disc readable by the DVD player. Therefore, a user inserts the disc containing the filters of interest into the tray or slot normally employed for playback. The DVD player, recognizing the disc as one containing filters, installs the filters from the disc, possibly at the guidance of the user by way of the player menu system.

While filter delivery and installation via a disc is convenient, additional methods of installing the content filters in a DVD player that do not require the shipment of a disc from a filter provider to the user or consumer may be advantageous.

SUMMARY OF ASPECTS OF THE INVENTION

Generally, embodiments of the present invention provide a method and associated user interface for downloading audio and/or video content filters to a DVD player or similar media player over a data communication medium.

One particular configuration of the present invention is a method for downloading at least one media content filter from a remote storage. The configuration comprises establishing communication with the remote storage; requesting the at least one media content filter; receiving the at least one media content filter from the remote storage; and locally storing the at least one media content filter in a local storage.

Another particular configuration of the present invention is a method for transmitting at least one media content filter from a remote storage to a local storage of a media player, the method comprises establishing a connection with the media player; receiving an identification of the at least one media content filter requested from the media player; determining whether the at least one media content filter is available; and transmitting the at least one media content filter to the media player.

Embodiments and advantages of the invention will be realized by those skilled in the art upon reading the detailed description of the invention, presented below.

BRIEF DESCRIPTION OF THE DRAWINGS

FIG. 7 illustrates a menu associated with a user's action of downloading a filter;

FIG. 12 is a menu providing a user with the option to obtain a filter by way of a removable memory media or downloading via some communication;

FIG. 14 is a menu providing the user with the option to purchase a filter and providing information concerning the price of the filter;

FIG. 15 is a menu similar to that shown in FIG. 14;

FIG. 16 is a menu providing input windows for a user to enter a password;

FIG. 18 is a menu providing information to the user concerning downloading of a particular filter or filters;

FIG. 24 is a user menu providing a way for a user to delete certain filters in order to increase memory space for the storage of new downloaded filters;

FIG. 32 is a user menu providing an input window for a user to enter the dialup number in order to establish a dialup connection with the server;

DETAILED DESCRIPTION OF THE INVENTION

Figure 1:
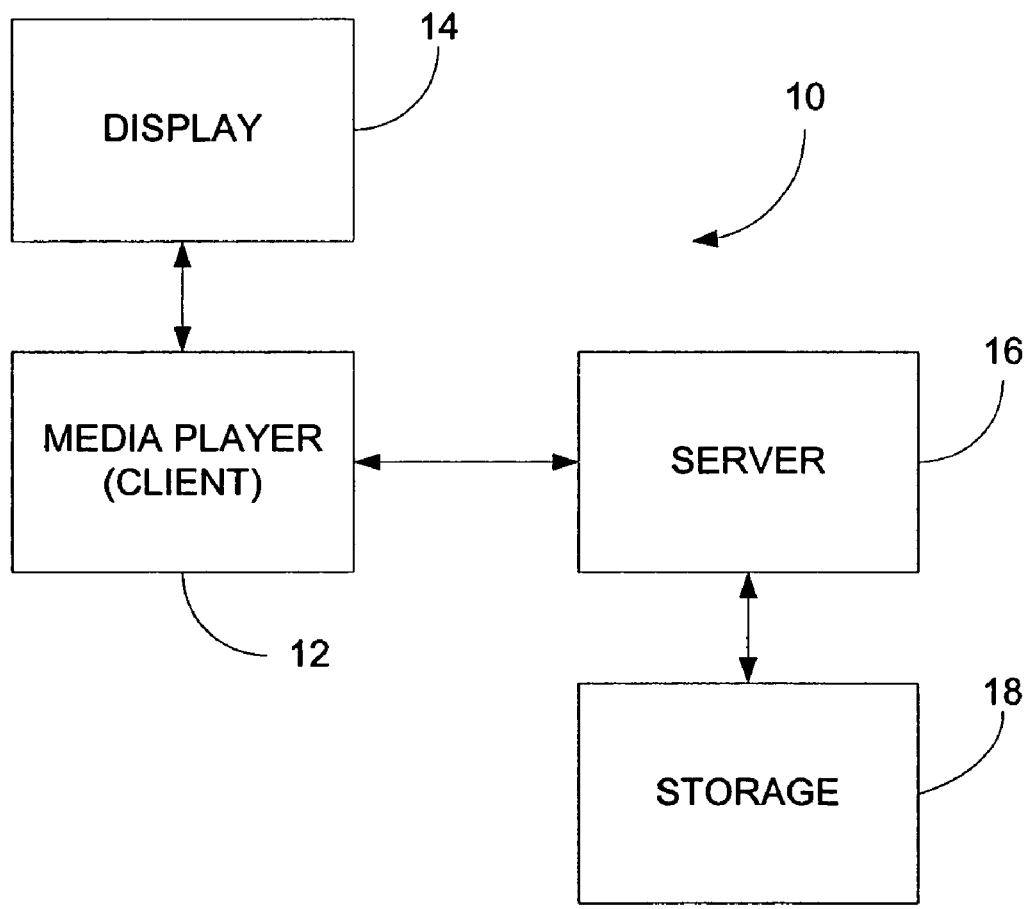
FIG. 1 is a block diagram illustrating a client server system arrangement, in accordance with aspects of the present invention.

FIG. 1 illustrates one particular system 10 configuration conforming to aspects of the present invention. Generally, the system is in a client server arrangement. The client computing platform 12 may be provided in any computing arrangement. In one particular example, the media player is a DVD player operably coupled with a display 14, such as a television. The server computing platform 16 may also be provided in any computing arrangement. The server is operably coupled with some form of data storage arrangement 18 configured to store some number of media filter files. In one particular arrangement, the server computing device includes a Linux based operating system and a file system (hard drive and drivers for accessing content) where the individual media filter files are stored. The files are sent via an ftp client/server relationship when the client media player connects with the server through a modern connection.

The client computing platform 12 includes media filtering capability of some sort. Additionally, the storage 18 of the server 16 includes corresponding media filter files. Generally, the media filtering capability employs the media filtering files in order to alter play of a multimedia presentation according to user selections. In some particular arrangements, the media filtering capability and media filter files are those described in U.S. Pat. Nos. 6,898,799 and 6,889,383 and U.S. application Ser. No. 11/104,924 referenced and incorporated above. In these particular arrangements, media filter files are provided for various movie titles available on some form of memory suitable for storing video and/or audio, such as DVD. The media filter files define portions of a movie that are associated with various types of scenes and language potentially unsuitable for certain audiences, such as portions of a movie with graphic violence, gory violence, sexually explicit behavior, explicit drug use, etc. A user may elect to have certain types of scenes skipped or muted. The media filtering capability monitors play of the movie and scenes identified in the filter file. When the media filtering capability identifies an elected type of scene, it operates to perform a skip of the scene or to mute the audio associated with the scene.

Figure 2:
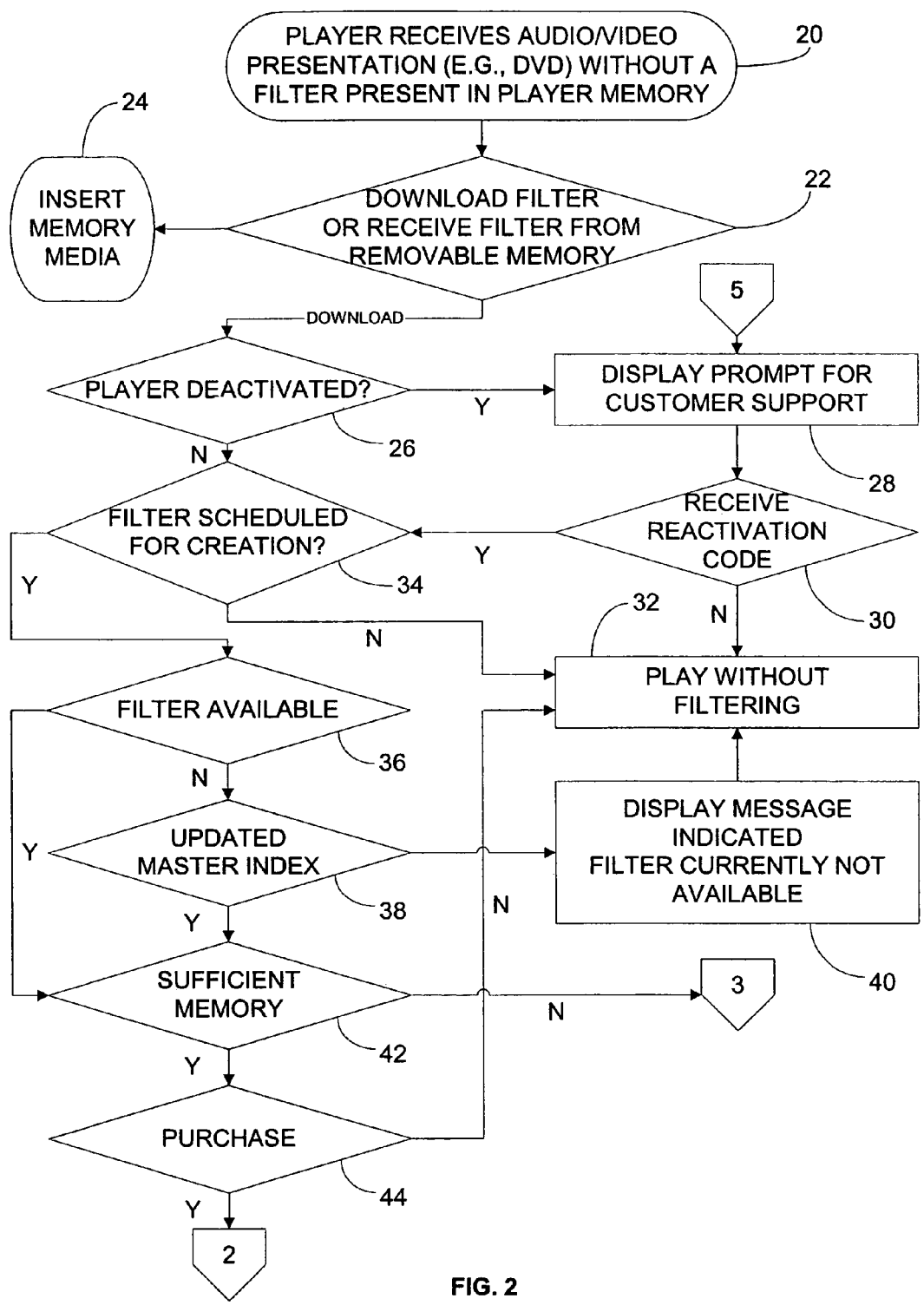
FIGS. 2-6 illustrate various aspects of a method for loading filters in a client media player device from a server device, in accordance with aspects of the present invention.
Figure 3:
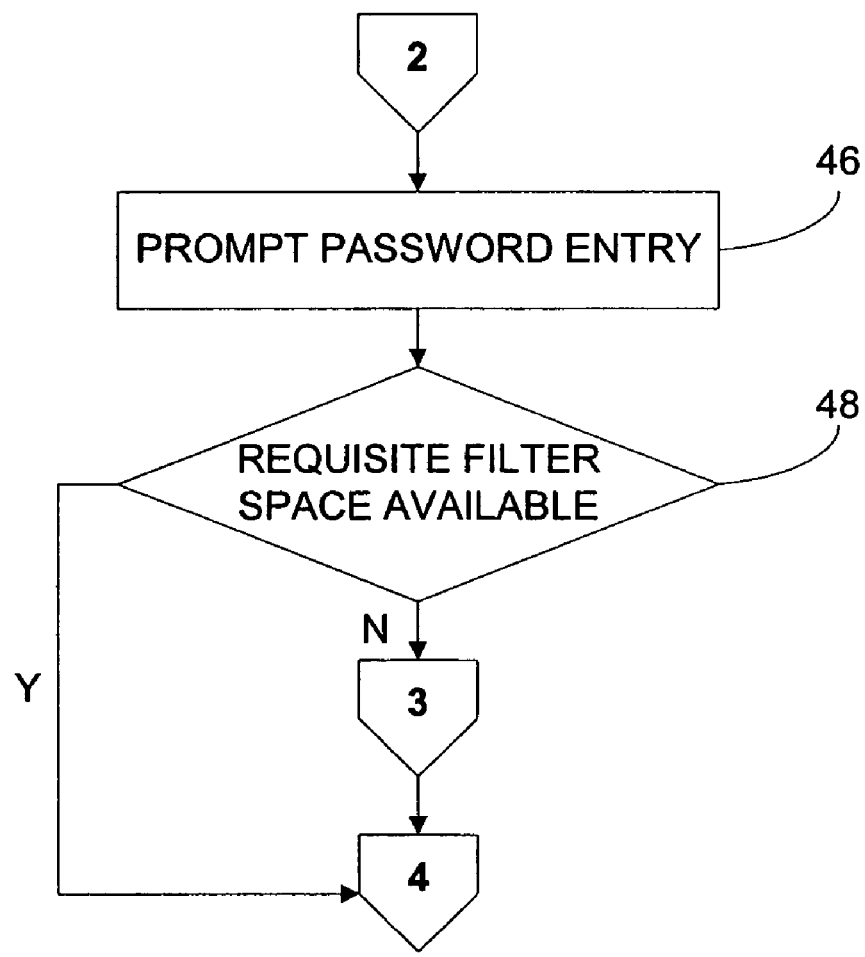
Figure 4:
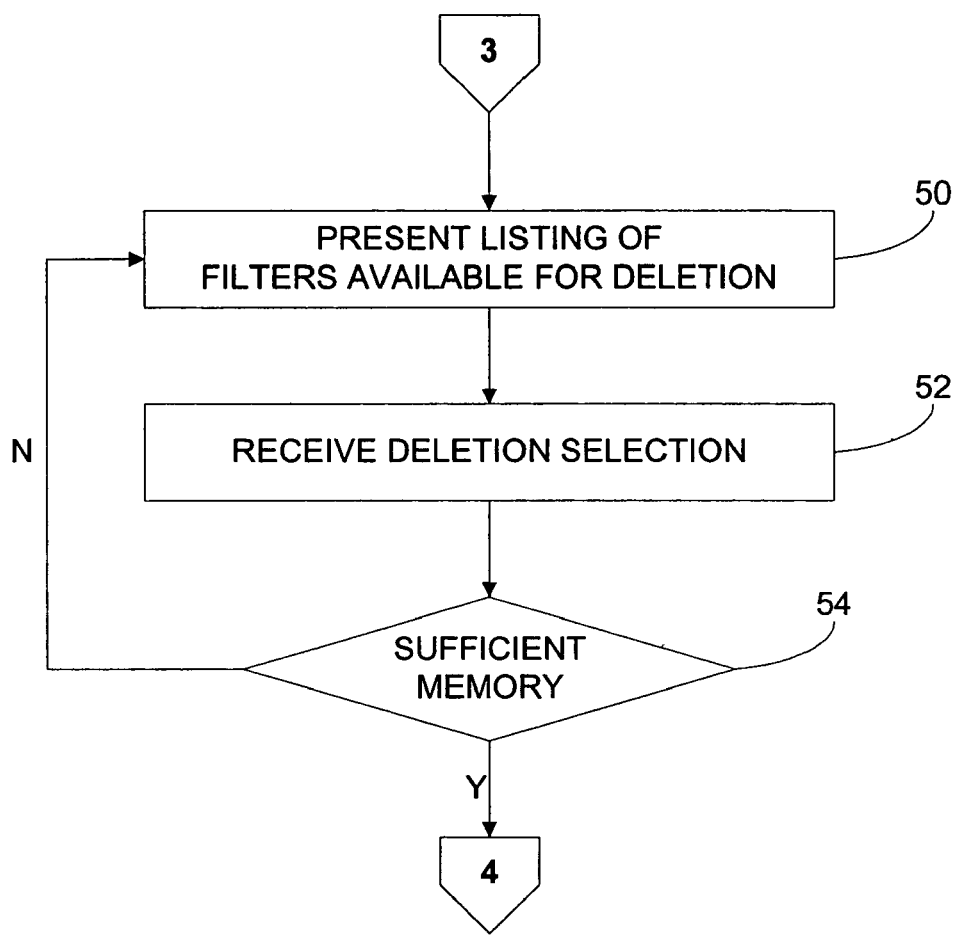
Figure 5:
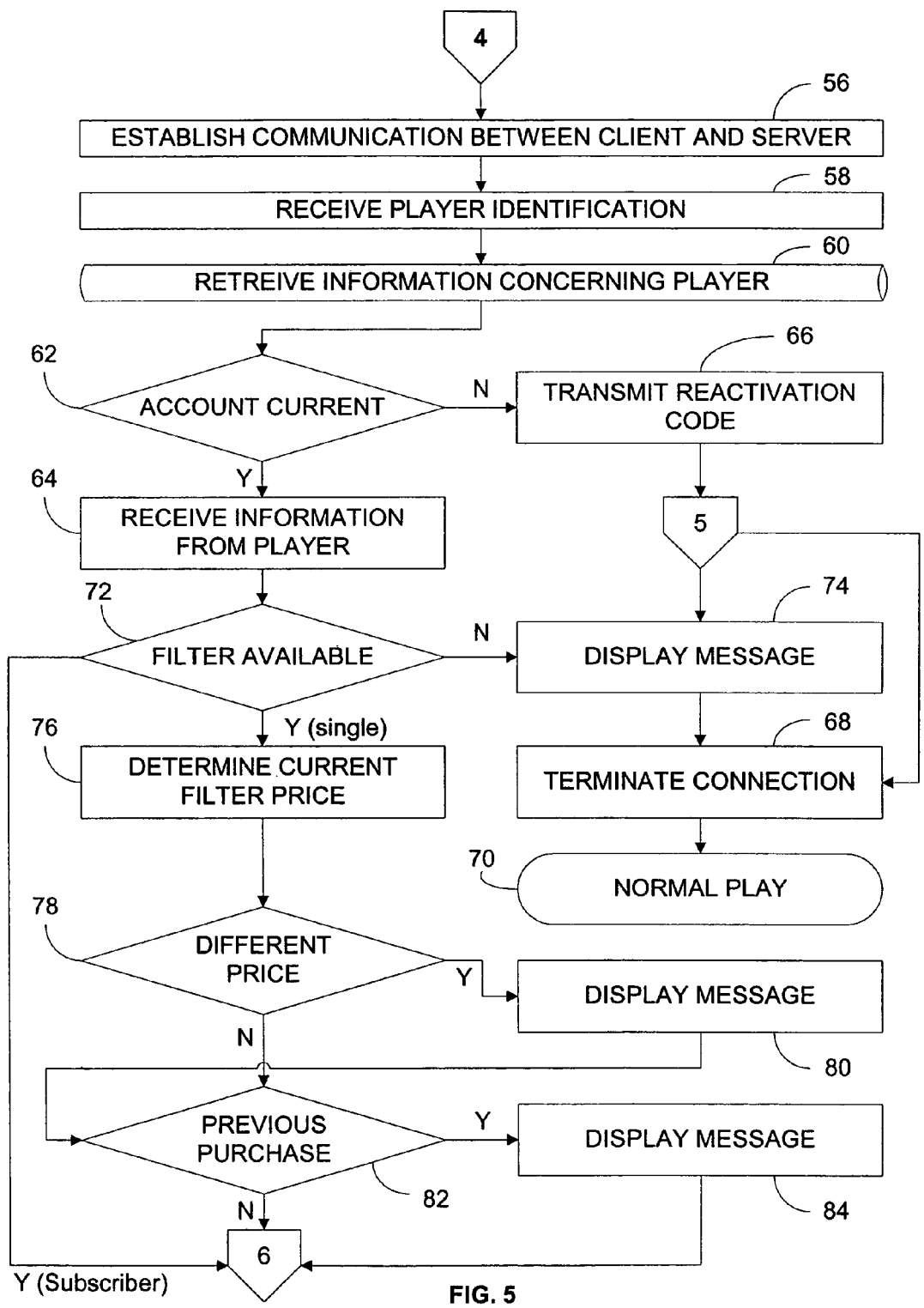
Figure 6:
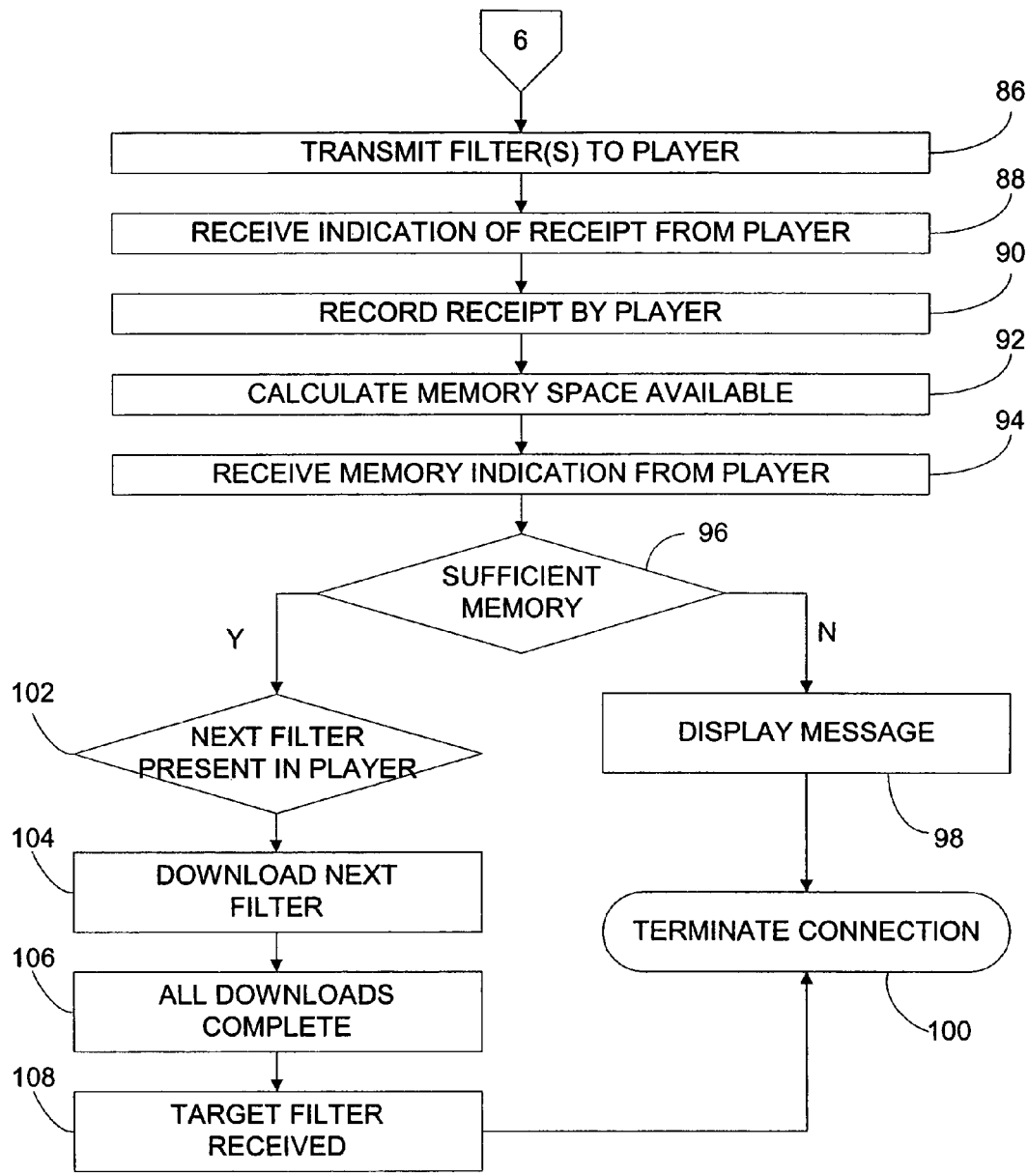

FIGS. 2-6 illustrate a method for downloading one or more audio or video media content filters from the server 16 and storage 18 to the client media player 12. FIGS. 2-4 illustrate operations that are primarily performed at the client computing device, although some of the operation may occur at the server. On the other hand, FIGS. 5-6 illustrate operations that are primarily performed at the server, although some of the operations occur at the client.

FIGS. 7-36 illustrate some examples of user menus that are presented on a display and provide an input medium for a user to interface with the client device or server. Some of the menus are primarily informational in nature, i.e., the screen displays text describing ongoing or subsequent operations. In one example, the user interacts with the menus by way of a remote control. Different features (buttons) of the menus may be highlighted by way of manipulating arrow keys on the remote control. When the appropriate button is highlighted, the action associated with the button is taken by depressing a "select," "enter," or a similar remote control key. The client may also include other input mechanisms such as a keyboard, integrated keys, touch screen, etc. The various menu screens of FIGS. 7-36 presented to the user are shown, along with an indication of the next menu screen and associated player function that are provided as a result of the particular front panel or remote control button pressed by the user. The descriptive text associated with each menu generally corresponds with the operation of FIGS. 2-6. In the particular embodiment associated with the menu screens presented herein, the options provided to the user at times depend on whether the media player allows filter installation via a CD, DVD, or other removable memory media, in addition to filter installation by way of a data communication medium and the client server arrangements described herein.

Figure 9:
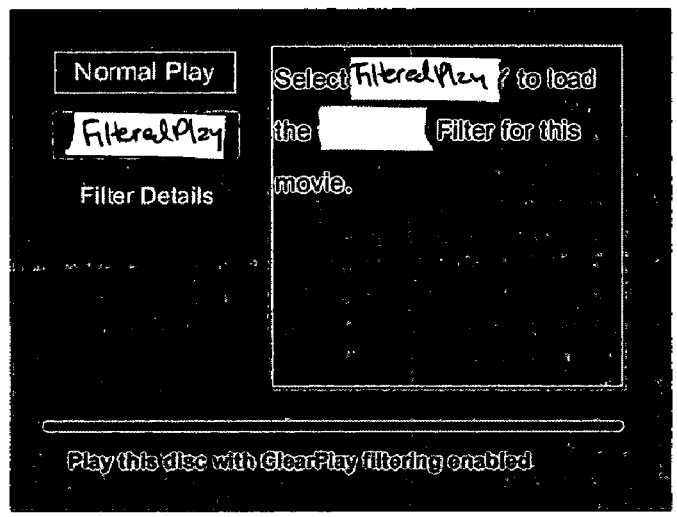
FIG. 9 is a menu instructing a user to select the Filter Play button in order to obtain a filter for a particular movie.

Referring to FIG. 2, the process of loading a filter not currently residing in the media player is initiated by the player recognizing that a removable memory (e.g., DVD) with media content that has no corresponding filter has been loaded in the player (operation 20). For ease of discussion, the remainder of this application will typically refer to media content in terms of one particular type of media content, i.e., a motion picture movie provided on DVD. A movie, however, is only one particular form of media content that may be associated with embodiments conforming to the present invention. Any other forms of media content and multimedia content may also be applicable to embodiments conforming to the present invention. Once the media player determines the identity of the movie and the lack of a filter for that movie, the media player provides an on-screen menu which allows the user to obtain a filter for the movie. If filter updates by way of removable memory media are not supported in the player, the initial menu provided is that shown in the menu of FIG. 7. Alternatively, if filter updates via removable memory media are supported, in addition to those provided by way of a client server arrangement, the menu of FIG. 9 is presented to the user. One particular media player configured to receive media content filters from alternative storage mediums is described in U.S. Provisional Application No. 60/641,678 titled "Video Player Configured to Receive Playback Filters From Alternative Storage Mediums," which is hereby incorporated by reference herein.

Figure 10:
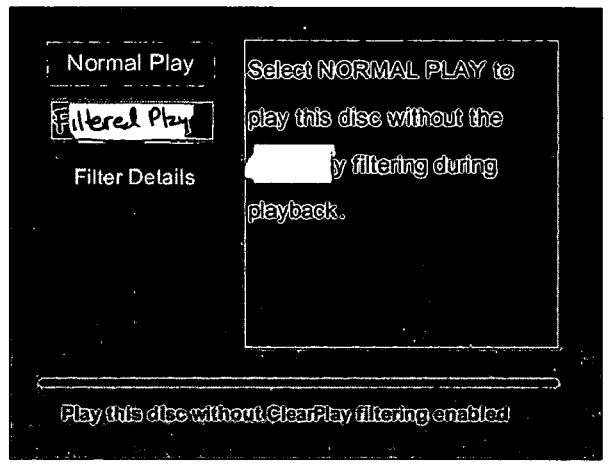
FIG. 10 is a menu instructing a user to select the Normal Play button in order to play a movie with no filtering.
Figure 11:
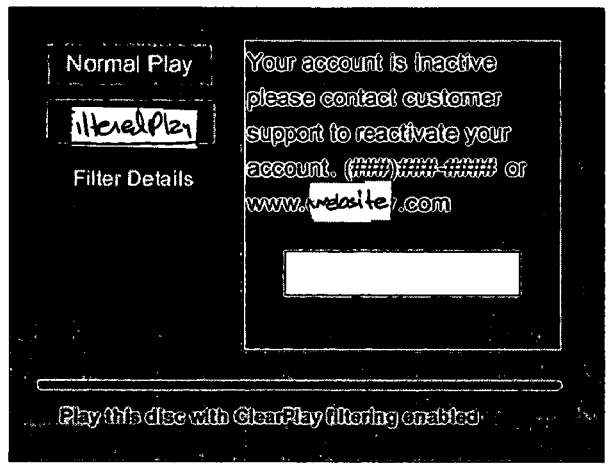
FIG. 11 is a menu providing information to a user concerning the activity of the user's filter account.
Figure 13:
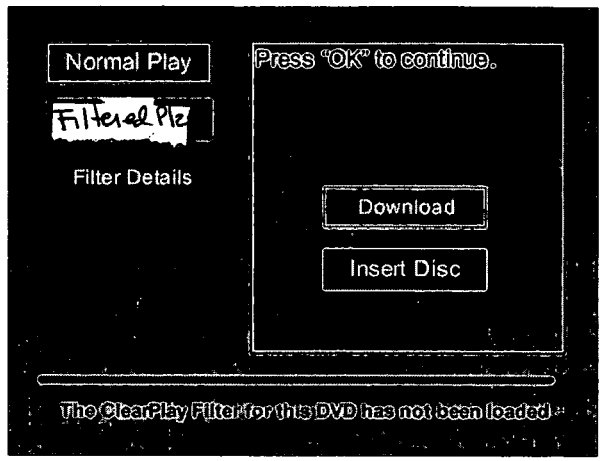
FIG. 13 is a menu similar to that shown in FIG. 12.
Figure 17:
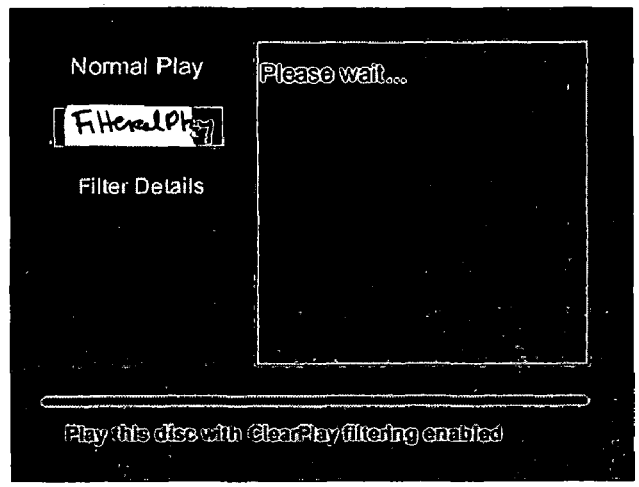
FIG. 17 is an informational menu providing information to the user concerning establishment of a connection with the server.
Figure 19:
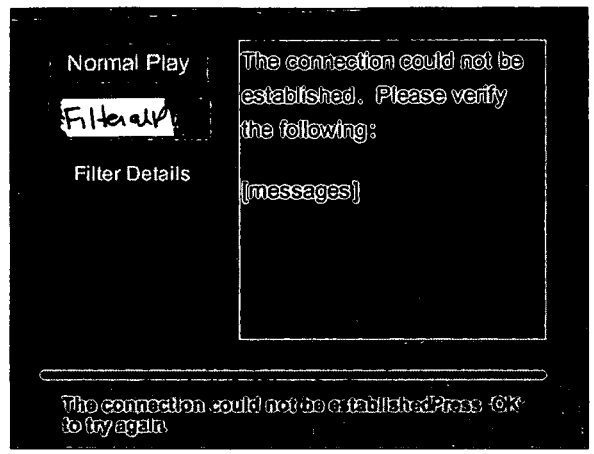
FIG. 19 is a menu providing information to the user concerning the inability to establish a connection with a server.
Figure 20:
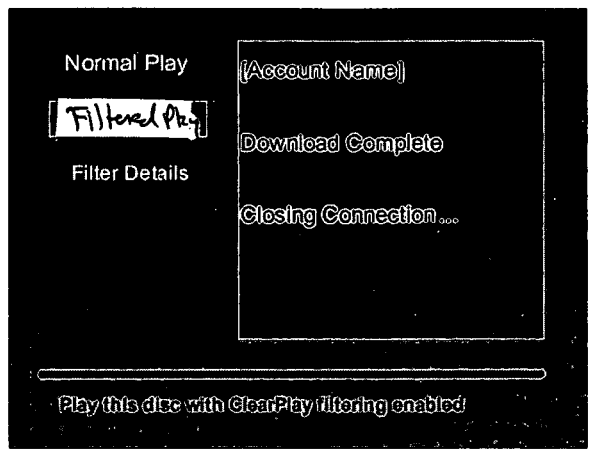
FIG. 20 is a user menu providing information concerning the successful downloading of a filter.
Figure 21:
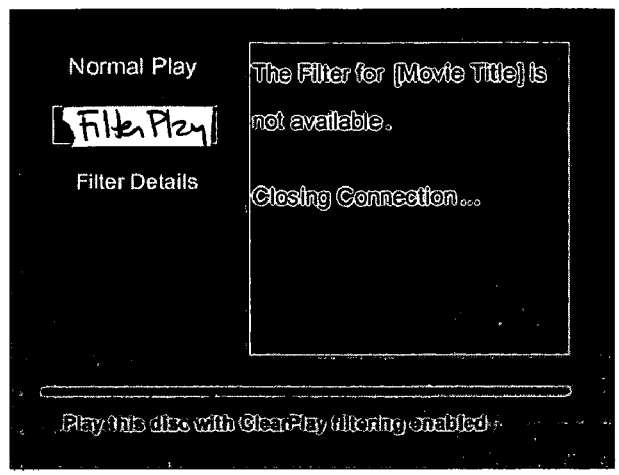
FIG. 21 is a menu providing information to the user that a particular filter or filters are not available.
Figure 22:
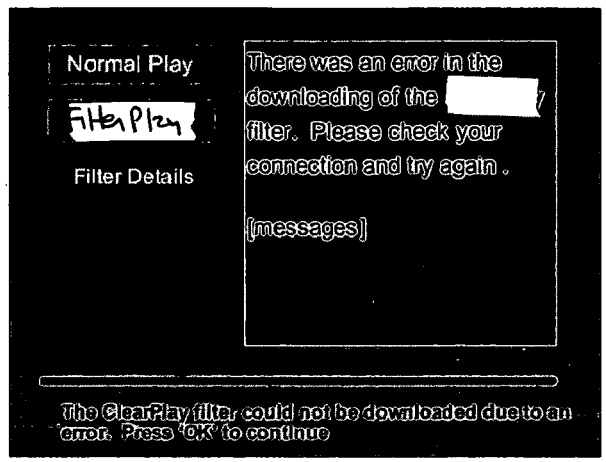
FIG. 22 is a menu providing information to the user concerning an error in the downloading of a filter.
Figure 23:
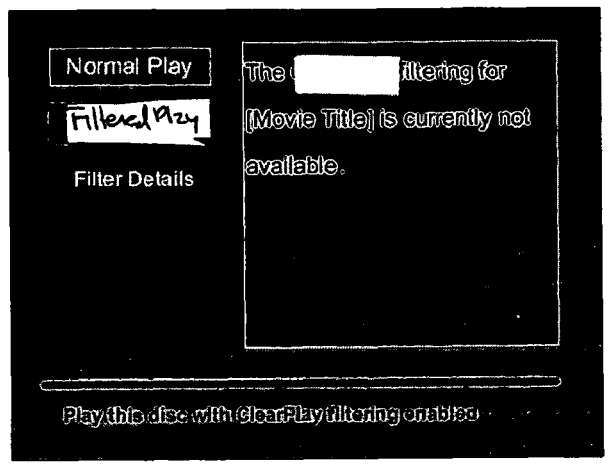
FIG. 23 is a user menu providing information to the user that a particular filter is not available.
Figure 25:
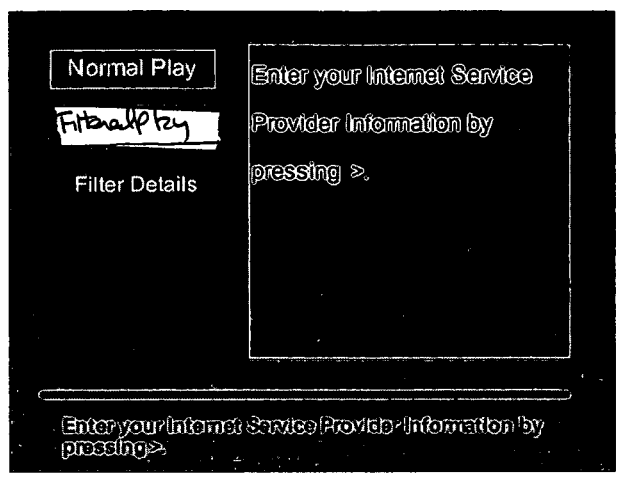
FIG. 25 is a user menu allowing a user to establish ISP information in order for the client device to connect with a server by way of an ISP connection.
Figure 26:
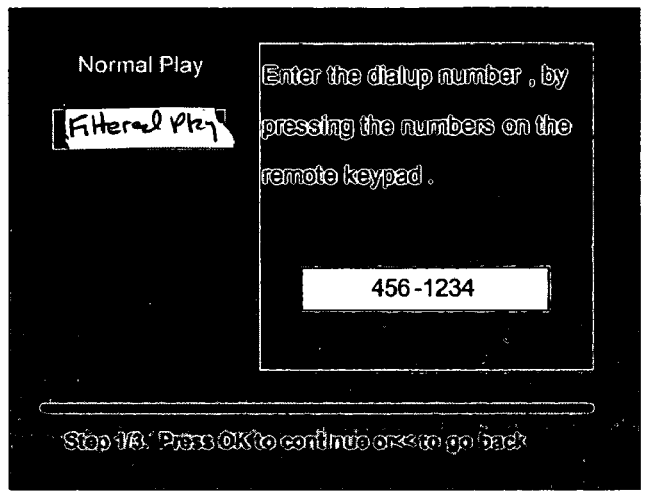
FIG. 26 is a user menu providing an input window for a user to enter the dialup number for an ISP.

Whether or not filter updates via CD or DVD are allowed, the user is provided in the menus of FIG. 7 and FIG. 9 with a set of three on-screen buttons which allow the user to either obtain more information about the filter, begin the process of loading the filter into the DVD player, or play the loaded disc without filtering the content. When the user selects the "Normal Play" option, the media player will play the loaded DVD without the benefit of any filters, thus allowing the DVD to play without any skipping of the video and audio signals, or muting of the audio signal. As an aid to the user, the on-screen menu will display the function of the Normal Play button when highlighted by way of the arrow keys, as shown in the menu of FIG. 10. In an alternative embodiment, the player may prevent playback of the disc altogether by way of password protection. In either case, no filter associated with that disc will be loaded, and non-filtered play will begin.

The user may choose to obtain a filter by way of the "Filtered Play" menu option shown in the menus of FIGS. 7 and 9. If use of a CD, DVD, or some other form of removable memory for loading of filters is supported, selection of the Filtered Play button in the menu of FIG. 9 displays the menu of FIG. 12. The FIG. 12 menu provides the user with a choice of either downloading the corresponding filter over a phone connection (via the "Download" button), or allowing loading of the filter by way of a disc (via the "Insert Disc" button), as indicated (operation 22). Selection of the Insert Disc button then causes the DVD to prompt the user to load the disc containing the filter of interest (operation 24), unless the insufficient memory is available in the DVD player to allowing loading of the filter. Lack of filter memory is addressed and described in greater detail below.

If the Download button of the FIG. 12 menu is selected, or in the case that loading a filter via DVD or CD is not a supported option, several status checks typically are executed by the media player to determine if downloading the filter is possible. For example, the player first determines if the player is currently deactivated (operation 26). Deactivation of the player, typically denoted within the player by way of a stored deactivation code or setting a flag, indicates that the user has never activated the player to take advantage of media content filters, has discontinued his account with the filter provider, has allowed his account to lapse (e.g., by not paying a monthly subscription fee), or for some other reason the player is not currently in an active state, i.e., ready to accept new filters. If the player is deactivated, the DVD player provides the menu of FIG. 11, instructing the user to contact the filter provider to activate or reactivate his account, thus providing the user with renewed access to a variety of media content filters (operation 28). Access to the filter provider may be provided by way of phone, e-mail, web site, or other means. This menu also provides a location whereby the user can insert a code supplied by the filter provider to reactivate the player (operation 30), thus enabling subsequent installation of filters. Otherwise, filter installation will not be possible, and the user may then elect to play the disc in "Normal Play" mode (operation 32), as described above.

In one embodiment of the invention, the initial activation of a media player after purchase may be implemented by way of a single code that may activate all media players equipped to install media content filters from the filter provider. Such a code may even be published on a website, or included with the documentation supplied with the player. On the other hand, a first reactivation, such as after a user account was terminated, would be implemented by way of a second, more private, code specifically employable for that media player. Further reactivations, if allowed, would each likely require separate reactivation codes as well.

Upon reactivation of an inactive account (operation 30) or verification of the active status of the player (operation 26), the media player determines whether the movie is scheduled to have a filter file. In one example, the player checks a Master Index residing within the player to determine if the content on the currently loaded disc will ever have a corresponding filter (operation 34 of FIG. 1). Generally, the Master Index provides a list of films for which media content filters are currently available. A current Master Index is downloaded to player memory whenever the player connects to the server. The Master Index may also be updated (replaced with most recent version) when a filter disc or other removable memory is in communication with the player. In addition, a list of movies for which a filter will never be generated is also supplied. Many movies and similar presentations do not realistically contain any objectively objectionable content. For example, many G-rated (General Audience) children's movies do not contain any sexual, violent or profane material that warrant being skipped or muted by a media content filter. If no filter will even be produced for the disc in question, the menu of FIG. 23 or a similar menu is provided indicating that no filter is available. The menu also allows the user to select the Normal Play option to play the disc without a filter (operation 32).

If the disc content is the potential target of a filter, the media player checks the Master Index to determine if such a filter is available for download (operation 36). If the Master Index indicates that the filter is not available, the player then determines whether the Master Index has been updated recently from the filter provider (operation 38). Updating of the Master Index may be considered recent if it has occurred, for example, within the last twelve hours. In other embodiments, an update may be considered recent only if it has occurred within the last few minutes or hours, or within the last few days or weeks. If the information in the Master Index is considered up-to-date, the media player presents the menu of FIG. 23 or a similar menu to indicate that a filter is not available (operation 40), and to allow the user to play the DVD without content filtering (operation 32). If the Master Index is current and the filter was not available in operation 36, then the player assumes the filter is not available. This determination is made without connecting to the server, which optimizes efficiency and cost concerns by not connecting when it is not necessary.

If the Master Index indicates that a filter associated with the loaded disc is available, or if the Master Index has not been updated recently, the DVD player may additionally check if there is any available memory for an additional filter (operation 42). Determinations of sufficient memory is identified at several times in the methods described herein. It is possible to eliminate or rearrange the time of these determinations, or eliminate the determinations altogether. A method for deleting filters in order to provide sufficient memory for a new filter is described in detail below. At the time of determining whether there is sufficient memory in the local storage for additional filters, the player or server may further determine whether the particular filter for the movie has been recently deleted from the player, or whether it has been deleted repeatedly. In such instances, the player may prohibit a connection with the server or the server may prohibit downloading of the filter. Such prohibition may be necessary at times to prohibit frequent unnecessary connections to the server or other system abuse.

Figure 8:
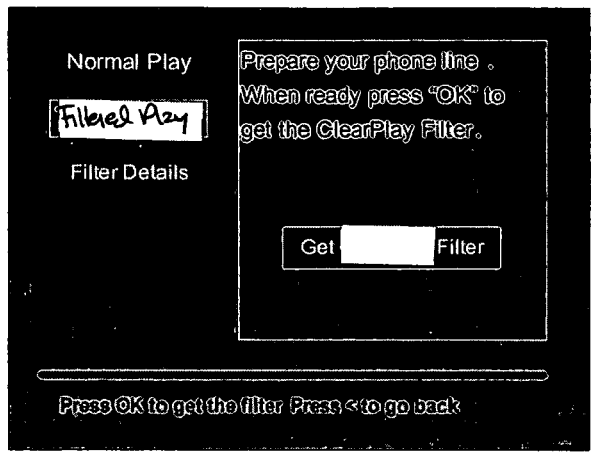
FIG. 8 is a menu instructing a user to connect a phone line to the media player in order to download a filter.

Assuming available memory space for a filter, the media player then provides the menu of FIG. 8 to alert the user to prepare a communication medium, such as a phone line, network connection, cable, DSL line, wireless port, Cellular, satellite, line of sight devices, microwave, radio transmissions, etc., for use by the media player to enable receipt of the filter. In other words, with reference to the particular example of a dialup connection, a currently unused phone line should be connected to the media player if one has not already been provided. After a communication medium is prepared, the user is directed to select the "Get Filter" button of the menu of FIG. 8 to allow communication with the server, typically a computer, of the filter provider. In alternative embodiments, connection to the filter provider server may occur by way of wireless connection, Ethernet, or other connection means.

In another embodiment, the filter provider server may actually be a computer not located at the site of the filter provider. For example, the server may actually be a computer located in the home of the user or is on a network accessible by the user, wherein the computer has downloaded the files from the filter provider or another source. In that case, the media player may connect to the home computer containing the filters by any means, including phone connection, Internet, Universal Serial Bus (USB), or wireless (for example, infrared) connection. Alternatively, the client may be a computer separate from the media player. Filter files are downloaded to memory of the client, and then transferred to the media player memory. The transfer may occur over a communication medium or the filters may be stored to a removable memory media and physically transported to the media player.

Once the user presses the Get Filter button, the media player (client) checks an internal memory location to determine the type of account the user maintains with the filter provider (server). Such information is typically loaded into the media player the first time the media player connects to the filter provider server. As a result, if the next connection will be the initial connection, the player may assume a particular type of account prior to downloading the actual account information from the filter provider server. If the user possesses a "single filter" account, which allows the user to purchase single filters one at a time from the filter provider, the media player displays the menu of FIG. 14, which inquires whether the user wishes to purchase the filter associated with the loaded disc (operation 44). In an alternative embodiment, the menu may display the cost of the filter (e.g., $1.00) to the user, depending upon whether the cost of the filter is reflected in the Master Index. In addition, if the Master Index does not indicate a cost for that specific filter, the menu of FIG. 14 displays the cost, an estimated cost, or a range of costs, for that filter. The user may then decline to purchase the filter (FIG. 15, "Cancel" selected), in which case the player displays the menu of FIG. 7, as described above, to allow the user to play the disc without a filter (operation 32).

Alternatively, the user may instead elect to purchase the single filter by selecting the Purchase button of FIG. 14, in which case the player presents the menu of FIG. 16, or may elect to purchase by selecting the "Cancel" button as shown in FIG. 15. The FIG. 16 menu includes an input window or window where the user may enter a password to allow the purchase to take place (operation 46). The user may also be prompted to enter a user name, account name, or the like. If the user enters a valid password, the player may then establish a connection with the filter provider server.

Returning to the menu of FIG. 12, if the user instead maintains a "subscriber" type of account with the filter provider, an inquiry to the user to purchase the filter is not required, and the password entry window of FIG. 16 is presented to allow connection of the player to the filter provider (operation 46).

Prior to connecting with the filter provider, the media player may optionally check whether enough memory space is available to store new filters (operation 48). The player may further make the determination based on the type of account. More specifically, if the user has a single filter account, memory space for only a single filter is required. However, if a subscriber account is involved, several filters may be downloaded during any given connection with the server. For example, if the user subscription allows fifteen filters to be downloaded per connection, space for fifteen additional filters should be available. In either case, if enough space is currently available in the internal memory of the media player, the connection process ensues, as described below (FIG. 5).

Figure 35:
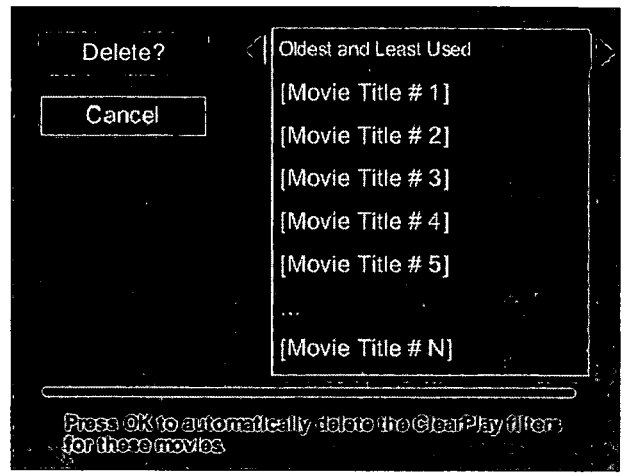
FIG. 35 is a user menu providing a listing of the oldest and/or least used filters and prompting the user to delete these filters.
Figure 36:
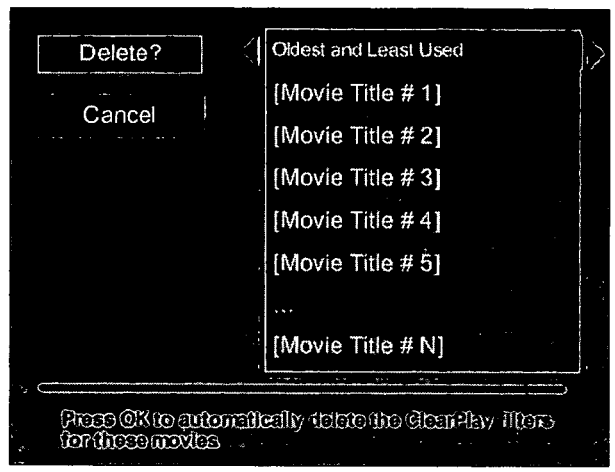
FIG. 36 is a user menu similar to that shown in FIG. 35.

If, instead, available player memory space is lacking, existing filters have to be deleted in order to have sufficient space for new filters. In one particular implementation, the player displays the menu of FIG. 24. The menu provides an alphabetical organization of the filters currently loaded in the media player (operation 50), along with an indication of the amount or percentage of memory storage currently filled. The user may then select any particular filters for deletion, thereby freeing additional space in the memory of the player for the new filters (operation 52). The player may require a deletion of a number of filters corresponding with the number of filters that will be downloaded. For example, if the user maintains a subscription allowing for 15 filters per download, then the player will require deletion of 15 filter files before downloading. Additionally or alternatively, the player may provide the menus of FIGS. 33 and 34, which notify the user of a number of filters that are the oldest, least used, or both, currently residing within the player. The number of filters selected may further correspond to the number of filters previously identified by the player that may be downloaded from the filter provider, depending on the type of account maintained by the user. By way of the DVD player arrow keys or similar input means, the user may peruse the list of filters selected by the player for deletion, as shown in the menus of FIGS. 35 and 36. The user then has the option to keep (by way of the "Cancel" button) or delete (via the "Delete" button) the selected filters.

If the media player then determines that enough space is available for the expected number of filters to be downloaded (operation 54), the media player may begin initiating a connection with the filter provider (operation 56). The nature of the actual connection may take on any number of forms. In one particular example, the connection with the filter provider may be a simple modulator-demodulator (modem) dialup connection, for which only the phone number of the filter provider providing dialup access to the filters is required. The user may also have to enter a user name and password. Alternatively the player may automatically transmit the user name and password when a connection to the server is established.

The phone number may be preprogrammed in the media player by the player manufacturer, or may be a number provided to the user by the filter provider. In the latter situation, the media player would provide the menu of FIG. 32 or a similar menu by which the user could input the dialup number by way of numeric keys of the front panel or remote control device of the player.

Figure 27:
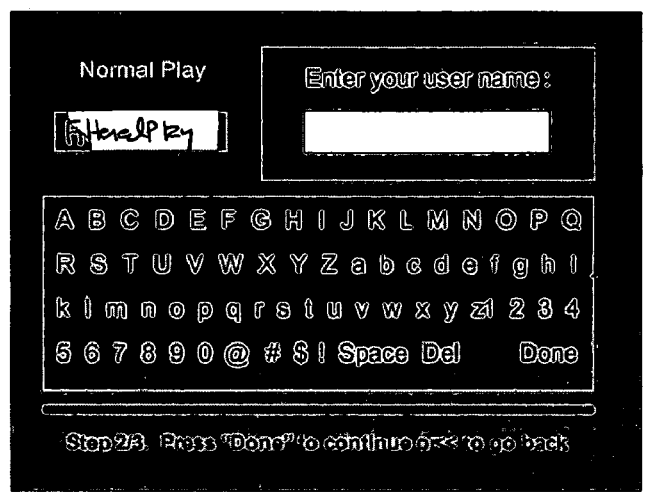
FIG. 27 is a user menu providing an input window for a user to enter a user name for the ISP.
Figure 28:
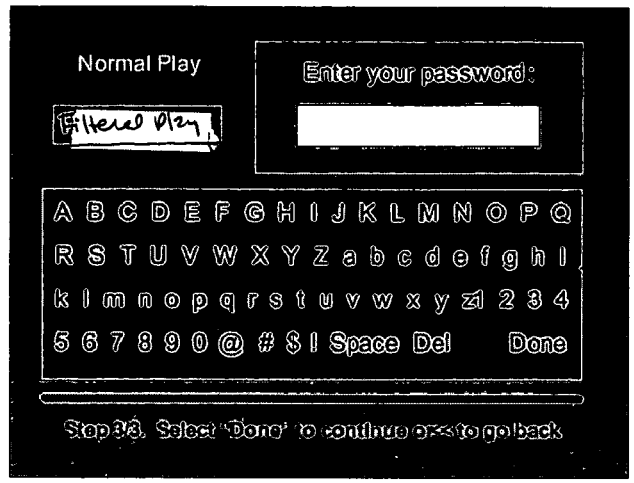
FIG. 28 is similar to FIG. 27 but provides a window for entering a password for the ISP.

Alternatively or in addition to a direct dialup connection, the media player may allow the user to employ his own Internet service provider (ISP) to connect with the filter provider via the Internet. In that case, the media player may allow an option to preload into the media player information required to initiate an Internet connection. For example, the menu of FIG. 25 allows the user to enter his ISP information by pressing the right-arrow key. The media player then leads the user through a series of menus to enter the phone number (FIG. 26), user name (FIG. 27), and password (FIG. 27) of the user's ISP account. Such information may be entered by way of numeric keys, as described above, or via a alphanumeric array displayed on one of the menus (FIG. 27). Each individual character of the array may then be selected and entered by way of the normal arrow and select keys of the front panel or remote control of the player.

In other embodiments, the media player may receive the ISP information and similar data via another method than remote control. For example, the user may store the information on a transferable medium (such as a CD, a memory stick, or the like) by way of a computer or similar device having a suitable human-interface input device, such as a keyboard, and then transfer that information to the media player, for example by way of the DVD reader of the DVD player, a memory stick interface, or other interface of the media player that receives the memory medium. In an alternative embodiment, the ISP connection information or similar data may be generated on a computer and sent by way of the Internet directly to the media player by its own Internet connection. In either case, the ISP information or other data normally transferable from the user to the player by way of remote control or other standard means would be stored in the player more quickly and efficiently.

Figure 29:
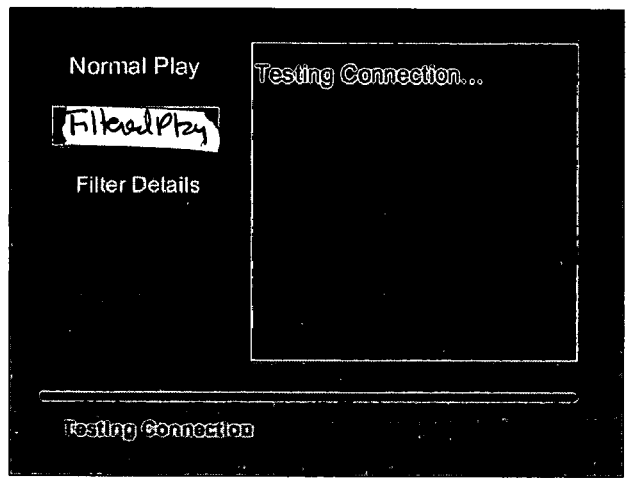
FIG. 29 is a menu providing information to a user concerning the testing of an ISP connection.
Figure 30:
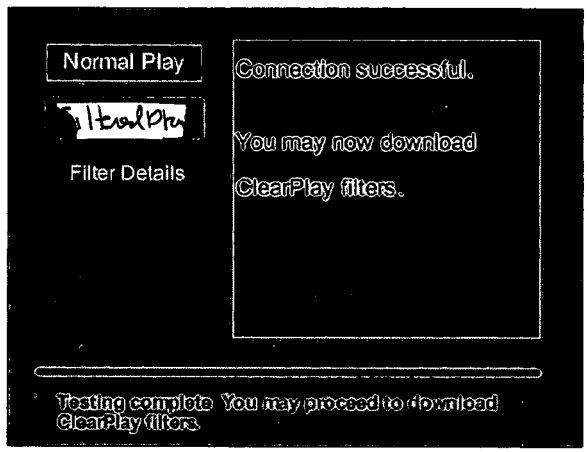
FIG. 30 is a menu providing information about the successful connection to an ISP.
Figure 31:
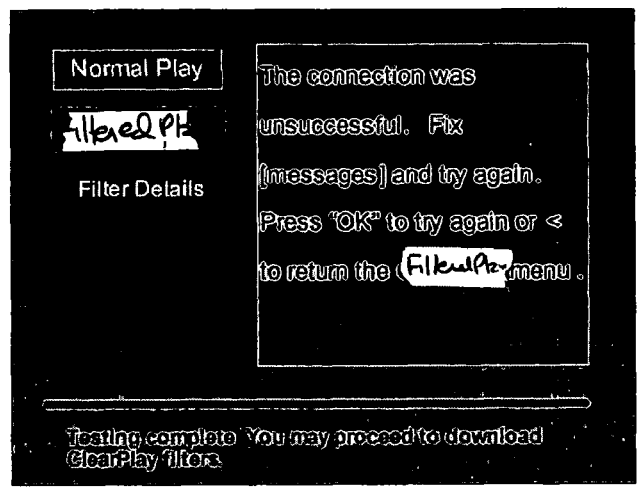
FIG. 31 is a user menu providing information concerning the unsuccessful connection to an ISP.
Figure 33:
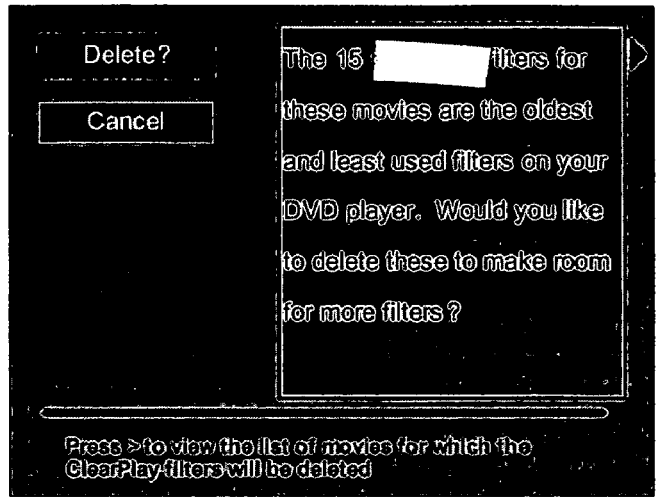
FIG. 33 is a user menu providing information concerning the deletion of certain filters.
Figure 34:
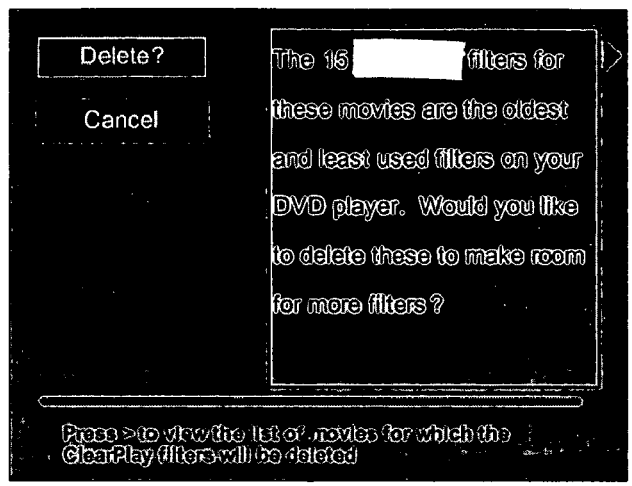
FIG. 34 is similar to that shown in FIG. 33.

After the ISP information is entered, the player may then test the connection using the entered information while displaying the menu of FIG. 29, which relates the progress of the test. This progress may be shown by indicating when dialing is occurring, when the user name and password are being transferred, and the like. If the test of the ISP connection is successful, the media player then displays the menu of FIG. 30 or a similar menu indicating this fact. If the test is unsuccessful, a menu, such as the menu of FIG. 31, may be shown indicating that the test was not successful, possibly along with an indication of the source of the error, such as an incorrect phone number, user name, or password.

The dialup number or ISP information discussed above may be provided at any point prior to the media player attempting to establish a connection with the filter provider. For example, the user may program the information into the media player before a disc is inserted into the player for viewing.

Presuming the required connection information has been loaded into the media player, a connection to obtain a filter may commence (operation 56). The media player dials the programmed phone number to establish the connection. While the connection is being attempted, the player presents the menu of FIG. 17 indicating so. If the connection fails, the media player communicates this fact to the user via the menu of FIG. 19, possibly with some indication as to the cause of the failure.

Generally, as described below, the operations executed by both the server and the client player while the connection is active are structured such that connection time is reduced, thus making the use of the remote connection between player and the server both time- and cost-efficient. In another embodiment, efficiency may not be of prime importance, thus allowing a different ordering of operations during the connection.

If the connection to the server of the filter provider is successful, the media player then transmits to the server an indication of the identity of the media player, usually in the form of the player serial number (operation 58). The server then consults a local database for information concerning the player and account, and may transmit some information to the player (operation 60). For example, the server may access any information associated with the account identified with the serial number, such as the account name, which may be transmitted to the media player. Also, the account information in the local database may be updated with any pertinent information available to the server at the time, such as the time of the current connection. Any customer service messages, such as a new customer service phone number or new dialup number, may be transmitted to the media player for display via a menu.

The server also determines the status of the player and related account (operation 62). Upon receipt of an account, the media player may transmit information regarding the currently-requested filter download (operation 64). This information includes the filter ID number, associated filter version and expected price of the filter, if obtainable within the Master Index residing within the player. If the filter information is not available via the Master Index, the player may send some other indication of the identity of the loaded disc in lieu thereof. Also, the player may send an indication of the amount of free space available for filters in the memory of the player.

If the server cannot identify an account associated with the received player serial number (operation 62), the server may transmit an activation code to the player (operation 66). The player may then display a new account message, similar to the menu of FIG. 11 described above, informing the user as to how the player may be activated (operation 28). If a code is not promptly entered, the connection may terminate after some predetermined time (operation 68). The player may also allow the user to play the currently loaded disc without the use of a filter (operation 70). The player will be deactivated when the code has been sent. In one case, the activation code is sent and the connection is immediately terminated, and the player will display the necessary information for the user to be able to reactivate their player. The user will need to enter this activation code, that is usually kept on the server and accessed by a customer service representative. The player will be deactivated when the code has been sent. In one case, the activation code is sent and the connection is immediately terminated, and the player will display the necessary information for the user to be able to reactivate their player. The user will need to enter this activation code, that is usually kept on the server and accessed by a customer service representative.

If the server was able to identify an account in the database with the player serial number, but determines that the account is not current (deactivated) (operation 62), the server will transmit a reactivation code to the media player, as described above, and then subsequently close the connection (operation 68). The media player then provides the user information via the menu of FIG. 11 or a similar menu (as described above) indicating how the user may reactivate the player and account (operation 28). The user may then contact the filter provider, as described above, to reactivate the account before attempting to obtain more content filters. As before, the currently loaded disc may then be played without the benefit of a filter (operations 70/32). In one particular implementation, the server determines whether the user's account is a single or subscription.

Presuming the server has verified the active status of the connected player, the server then determines whether the requested filter (by way of the filter ID and version previously transferred by the player) is available (operation 72). If the filter is not available, the server indicates so to the player, which informs the user by way of the menu of FIG. 21 (operation 74). The message shown may be a dialog sent from the server or generated internally by the media player. The connection is also closed (operation 68). The user may then play the disc without a filter (operation 70).

If the requested filter is available (operation 72), the server determines which type of account is involved: a single filter account or a subscription account. In one embodiment, if the account of the single filter type, the server determines the current price of the filter (operation 76). The server may then compare the current price with the expected price (if any) relayed by the player from the Master Index (operation 78). If the price has changed, the server may send a message to be displayed on the menu of FIG. 18 indicating that the per filter price has changed, and that the new price will be effective on the next download after the transfer of the current filter (operation 80). The server then determines if the filter has already been purchased (operation 82), and if so, sends a message to be displayed on the menu of FIG. 18 indicating that the filter was previously purchased, and that the user will not be billed for downloading the filter (operation 94).

Regardless of the type of account involved, the server then prepares to transfer the one or more filters to be downloaded to the DVD player (operation 86). More specifically, the server places the requested filter (and additional filters, if a subscription account is involved) in a transmission queue for transmission to the player via the connection, and initiates the transfer. The server may also send a wait time associated with the requested filter to the player. Generally, the wait time indicates the next time the player will be allowed request download of this same filter to prevent multiple attempts to download the filter within a short time span. In one embodiment, the wait time may be transferred to the player in the case the filter is not yet available. In that case, the wait time may be set such that the player will not request that filter until the next possible time the filter is available for download.

In one particular implementation, if the user's account is a subscription then the server will attempt to send extra (high-use) filters, in addition to the particular filter associated with the movie, as described below before closing the connection. Sending the extra filters optimizes the use of the connection, and can help to eliminate the need for establishing later connections.

In addition, the server may update the account information, update a log indicating the player connected to the server, and update a transaction log to reflect the current filters to be purchased and downloaded. This information may be processed immediately, or may be batch processed at predetermined intervals, such as, for example, once per hour. Also, the server may also send an updated Master Index to be stored in the media player for later access by the user, as described above, as well as an indication of the filters to be downloaded via the connection to the player.

Once the filters are placed in the queue, and the transfer is initiated, the media player begins receiving each filter, one at a time, stores (or "commits") the filter received to the filter storage area of the player, and then responds via the connection to the server with an indication that the filter has been committed (operation 88). In another embodiment, the media player receives multiple filters in a single burst, and commits them before responding to the server. The server then records the identity of the filter that has been committed by the player, updates the transmission queue by removing the committed filter, and updates the account to indicate the commission of the filter (operation 90).

The server then tracks the number of free memory blocks available in the player by reducing the number of available memory blocks in the player (as indicated previously by the player) by the amount of memory occupied by the transferred filter committed by the player (operation 92). Further, the server sends an indicator, such as a flag, to determine whether the player has enough free memory blocks in order to continue receiving filters. In response to the continue flag, the player checks if sufficient memory remains for another filter, and responds to the server with an indication (operation 94).

Next, the server determines if there is sufficient memory space to continue (operation 96). If insufficient memory remains for more filters in the queue to be transferred, the server indicates an estimated amount of available memory required for a subsequent download of filters. The player then closes the connection and displays a warning to the user by way of the menu of FIG. 22 or a similar menu indicating that the filter download could not be completed (operation 98). Furthermore, a player may set an internal flag indicating that insufficient memory was available to complete the download. The player may then proceed to check whether the filter requested for the loaded disc has been loaded, as described below. Further, the player may provide some estimate of the amount of space required to load additional filters (operation 98) and may direct the user to the filter deletion operation (FIG. 24).

If, on the other hand, sufficient free memory is available for downloading another filter, the player determines if the next filter to be downloaded is already loaded into the player (operation 102). If so, the player informs the server, which then updates the queue and the account as if the filter had been transmitted to the media player. Otherwise, the server again checks if any filters remain in the queue, and downloads the next filter to the player (operation 104). Downloading of each filter may effectively encompass operations 86-96.

Once the queue is empty (operation 106), indicating all filters have been downloaded, or if the transfer was interrupted for some reason, such as insufficient memory in the player, the server may indicate to the player an estimated amount of space that may be required for the next filter (or series of filters) remaining in the queue to be downloaded (operation 98). The size of the estimated amount of space depends upon, for example, whether a single filter account or a subscription account is involved. In one embodiment, the filter memory within the media player is defined in terms of "blocks" of some predetermined size. Even if the number of filters to be transmitted is known the indication of the amount of space for the filters to be downloaded remains an estimate, as each filter may occupy a different number of blocks in memory. In one embodiment, the estimate may be a "worst case" estimate, determined by the largest filter possible or currently available from the filter provider.

At the conclusion of the transfer, the player then determines whether the filter associated with the loaded disc has been received (operation 108). If so, the connection is closed, and an indication that the download is complete is provided by the menu of FIG. 20 (operation 100). The loaded disc may then be played employing the content filter. If the filter for the loaded disc has not been downloaded, a message via the menu of FIG. 21 or a similar menu is presented to the user indicating that the filter for the loaded disc could not be downloaded at this time, possibly with an indication as to the source of the problem, such as a lack of available memory in the player. In that case, the user would have the option of playing the disc without the benefit of the filter.

Throughout the time a connection is maintained between the server and the player, the server may track the elapsed time while awaiting a response from the player. In one embodiment, if the elapsed time exceeds a predetermined threshold, such as, for example, twenty seconds, the server may close the connection with the player.

Disclosed herein are several embodiments of a method and associated user interface for downloading media content filters to a media player or similar device from a filter provider by way of a phone, the Internet, or other remote connection. While the disclosed embodiments are described in specific terms, other embodiments encompassing principles of the invention are also possible. For example, while embodiments discuss a phone connection, other methods of connecting electronic devices, such as by way of wireless networking, may also be employed. Also, while specific examples of menus presented to the user have been provided, many other ways of presenting the same or related information may be employed to the same end. Further, while specific examples particularly discuss a DVD player, other types of media players capable of displaying movies and similar media presentations, may also be utilized within the scope of the invention.

Throughout the application, reference is made to the filter storage memory of the media player. While such memory is ordinarily thought of as memory integrated circuits permanently installed on a printed circuit board of the player, removable storage media may also be used to store the filters employed by the player. For example, memory sticks, USB sticks, removable flash memory, and the like, connectable to the an interface of the player accessible by the user, may be employed to similar end. As a result, a removable storage medium may be coupled with a home computer of the user. The user may then download the filters over the Internet from the filter provider, storing those filters into the removable storage medium. The medium could then be removed from the home computer, and connected to the media player by way of an interface of the player designed for the medium, such as a USB port. The player could then access the filters for use in filtering the content of the DVDs associated with those filters.

Further, operations and menus are presented in one particular order. The order, however, is but one example of the way that operations and menus may be provided. Operations and menus may be rearranged, modified, or eliminated in any particular implementation while still conforming to aspects of the invention.

We claim:

1. A method for transmitting at least one media content filter from a remote storage to a local storage media player, the method comprising:
    establishing a connection with a media player;
    receiving an identification of an at least one media content filter requested from the media player, the at least one media content filter identifying at least one discrete portion of a multimedia presentation and at least one filtering action associated with the portion of the multimedia presentation;
    providing for activating the media player to receive the at least one media content filter;
    determining whether the media player is associated with a valid user account for receiving the at least one media content filter;
    transmitting a reactivation code to a media player associated with an invalid user account for receiving the at least one media content filter;
    determining whether the at least one media content filter is available; and
    transmitting the at least one media content filter to the media player.

2. The method of claim 1 further comprising receiving an indication of payment prior to transmitting the at least one media content filter to the media player.

3. The method of claim 1 further comprising determining whether there is sufficient space available in the local storage of the media player prior to transmitting the at least one media content filter.

* * * * *